(12) United States Patent
Chandhoke et al.

(10) Patent No.: US 9,137,044 B2
(45) Date of Patent: Sep. 15, 2015

(54) SYSTEM AND METHOD FOR INTEROPERABILITY BETWEEN MULTIPLE NETWORKS

(71) Applicant: NATIONAL INSTRUMENTS CORPORATION, Austin, TX (US)

(72) Inventors: Sundeep Chandhoke, Austin, TX (US); Rodney W. Cummings, Austin, TX (US); Changzhe Gao, Shanghai (CN); Brian Keith Odom, Georgetown, TX (US)

(73) Assignee: National Instruments Corporation, Austin, TX (US)

( * ) Notice: Subject to any disclaimer, the term of this patent is extended or adjusted under 35 U.S.C. 154(b) by 163 days.

(21) Appl. No.: 14/054,227

(22) Filed: Oct. 15, 2013

(65) Prior Publication Data

US 2015/0103836 A1    Apr. 16, 2015

(51) Int. Cl.
*H04L 12/46* (2006.01)
*H04L 12/861* (2013.01)

(52) U.S. Cl.
CPC ........ *H04L 12/4666* (2013.01); *H04L 49/9057* (2013.01)

(58) Field of Classification Search
None
See application file for complete search history.

(56) References Cited

U.S. PATENT DOCUMENTS

| | | | |
|---|---|---|---|
| 6,515,993 B1* | 2/2003 | Williams et al. | 370/395.53 |
| 7,457,243 B2 | 11/2008 | Meggers et al. | |
| 8,203,980 B2* | 6/2012 | Sichner et al. | 370/285 |
| 2005/0157751 A1* | 7/2005 | Rabie et al. | 370/466 |
| 2007/0186010 A1* | 8/2007 | Hall et al. | 709/246 |
| 2008/0080543 A1* | 4/2008 | Hickox et al. | 370/419 |
| 2012/0254374 A1* | 10/2012 | Wheeler et al. | 709/220 |
| 2013/0195114 A1* | 8/2013 | Lessmann et al. | 370/401 |
| 2013/0286820 A1* | 10/2013 | Angst et al. | 370/225 |
| 2013/0329577 A1* | 12/2013 | Suzuki et al. | 370/252 |
| 2014/0040657 A1* | 2/2014 | Kiessling et al. | 714/4.1 |

FOREIGN PATENT DOCUMENTS

| | | |
|---|---|---|
| CN | 102 096 405 A | 6/2011 |
| WO | WO 02/25988 A1 | 3/2002 |

OTHER PUBLICATIONS

Patricia Thaler, Norman Finn, Don Fedyk, Glenn Parsons, Eric Gray; "Media Access Control Bridges and Virtual Bridged Local Area Networks" IEEE 802.1Q—Tutorial; Mar. 10, 2013 (77 pages).
International Search Report for Application No. PCT/US2014/060311, mailed Jan. 27, 2015; 5 pages.

\* cited by examiner

*Primary Examiner* — Brian Roberts
(74) *Attorney, Agent, or Firm* — Meyertons Hood Kivlin Kowert & Goetzel, P.C.; Jeffrey C. Hood; Mark S. Williams

(57) ABSTRACT

Systems and methods for interoperating between a time-sensitive (TS) network and a non-time-sensitive (NTS) network. The system may include a TS network switch and a TS network interface controller (NIC). Each may have a functional unit. A first port of the TS switch may be coupled to an NTS node of the NTS network and its functional unit may be configured to manage insertion and removal of tags associating packets received from the NTS network with the NTS network. The tagged packets may be forwarded on to the TS NIC via a second port. The functional unit of the TS NIC may be configured to queue tagged packets received from the TS network switch and queue and tag packets destined for the NTS network via the TS network switch.

15 Claims, 15 Drawing Sheets

```
┌─────────────────────────────────────────────────────────────────────────┐
│ providing a time-sensitive (TS) network switch, where the TS network switch includes a functional unit, │
│ a plurality of ports coupled to the functional unit, where each port is associated with a respective set of │
│ network addresses for TS packets, where each port is configured with a respective set of egress periods, │
│ where each TS packet has a destination address and a type that specifies a respective egress period, │
│ where each egress period specifies a respective time window and frequency for egressing TS packets to │
│ network nodes based on the type of the TS packets, and a plurality of queues, coupled to the plurality of │
│ ports and the functional unit, where each queue is associated with a respective TS packet type and a │
│ respective port of the plurality of ports │
│ 1502 │
└─────────────────────────────────────────────────────────────────────────┘
                                      │
                                      ▼
┌─────────────────────────────────────────────────────────────────────────┐
│ configuring the functional unit to receive one or more TS packets asynchronously from a network node │
│ via a first port │
│ 1504 │
└─────────────────────────────────────────────────────────────────────────┘
                                      │
                                      ▼
┌─────────────────────────────────────────────────────────────────────────┐
│ configuring the functional unit to determine a second port of the plurality of ports for egressing at least │
│ one of the one or more the TS packets based on the destination address of the at least one TS packet │
│ 1506 │
└─────────────────────────────────────────────────────────────────────────┘
                                      │
                                      ▼
┌─────────────────────────────────────────────────────────────────────────┐
│ configuring the functional unit to determine an egress period for egressing the at least one TS packet │
│ based on the type of the at least one TS packet │
│ 1508 │
└─────────────────────────────────────────────────────────────────────────┘
                                      │
                                      ▼
┌─────────────────────────────────────────────────────────────────────────┐
│ configuring the functional unit to determine that the at least one TS packet cannot currently be egressed │
│ from the second port │
│ 1510 │
└─────────────────────────────────────────────────────────────────────────┘
                                      │
                                      ▼
┌─────────────────────────────────────────────────────────────────────────┐
│ configuring the functional unit to queue the at least one TS packet in a first queue of the plurality of │
│ queues based on the respective TS packet type and destination address in response to determining that │
│ the at least one TS packet cannot currently be egressed, where the first queue is associated with the │
│ second port │
│ 1512 │
└─────────────────────────────────────────────────────────────────────────┘
                                      │
                                      ▼
┌─────────────────────────────────────────────────────────────────────────┐
│ configuring the functional unit to egress the at least one TS packet in the respective time window from the │
│ second port │
│ 1514 │
└─────────────────────────────────────────────────────────────────────────┘
```

*Figure 15*

SYSTEM AND METHOD FOR INTEROPERABILITY BETWEEN MULTIPLE NETWORKS

FIELD OF THE INVENTION

The present invention relates to the field of time-sensitive (TS) networks, and more particularly to systems and methods for interoperability between networks, including managing the configuration of virtual local area network (VLAN) tags and data flow paths between a TS network and a non TS (NTS) network, synchronization of clocks between networks, and scheduling data egress.

DESCRIPTION OF THE RELATED ART

In the industrial or embedded application field there are multiple real-time Ethernet implementations that are available. Although similar in function, each implementation differs such that each implementation is not interoperable with another implementation. For example, PROFINET, Ethernet for Control Automation Technology (EtherCAT), Ethernet Industrial Protocol (Ethernet/IP), and Ethernet Powerlink use the same Ethernet physical layer but are not interoperable amongst themselves. Additionally, these real-time Ethernet implementations cannot connect to standard IEEE 802.1 switches because the implementation of the media access control (MAC) layer used by each is customized to support its own proprietary protocol. Thus, since there is a multitude of existing deployments of real-time Ethernet based protocols, hereinafter referred to as non-time-sensitive (NTS) networks, there is a need to define how these existing proprietary technologies can coexist with standard IEEE 802.1 Ethernet technologies.

For example, the features that add real time data transfer support to standard Ethernet under IEEE 802.1 are collectively called Time Sensitive (TS) Networking. These features define stream reservation and time based scheduling in IEEE 802.1 in Ethernet switches. One the one hand, stream reservation guarantees bandwidth to real-time/time-sensitive streams, e.g., packets, end to end. On the other hand, time-based scheduling allows configuration of "windows of time" when only specific packets are allowed to egress a switch. "Windows of time" may be coordinated with transmission of time-sensitive packets, or TS packets, by endpoints to minimize the age of a data stream as it passes through the network. "Windows of time" also bounds the maximum latency of the stream from the producer to the consumers such that a precise schedule may be determined.

TS networking is based on Virtual Local Area Network (VLAN). A VLAN is a distinct isolated broadcast domain. VLANs are partitioned out of local area networks (LANs) and can only pass data between each other via a router or routers. Additionally, VLAN allows a switched network to be logically segmented on an organizational basis. In other words, the network is segmented by functions or applications rather than on a physical or geographical basis. A TS network pre-defines specific VLAN tags which allow identification of a TS packet as it is routed through a LAN.

A TS network interface controller (NIC) supports TS networking features via multiple queues. The queues segregate LAN traffic based on VLAN tags. However, as mentioned, non-time-sensitive, or NTS, network devices typically implement a custom MAC which is not IEEE 802.1 compliant, and thus, not compatible with TS networks. Therefore, there is a need for a solution to allow interoperability between TS networks and NTS networks, including the need to synchronize clocks between networks and the need to schedule data egress.

SUMMARY OF THE INVENTION

Various embodiments of a system and method for interoperability between networks, including managing the configuration of virtual local area network (VLAN) tags and data flow paths between a TS network and a non TS (NTS) network, synchronization of clocks between networks, and scheduling data egress are presented below.

In one embodiment, a system for interoperating between a time-sensitive (TS) network and a non-time-sensitive (NTS) network may include a TS network switch and a TS network interface controller (NIC). The TS network switch may include a first functional unit coupled to a plurality of ports. In certain embodiments, a first port of the plurality of ports may be configured to couple to an NTS node of the NTS network. The TS NIC may include a second functional unit, a third port, a plurality of NTS receive packet queues, and a corresponding plurality of NTS transmit packet queues. Further, the TS NIC may be configured to couple to a second port of the plurality of ports of the TS network switch. In some embodiments, the third port may be coupled to the second functional unit. Additionally, the plurality of NTS receive packet queues may be coupled to the second functional unit and the third port and may be configured to store received packets from respective NTS networks. The corresponding plurality of NTS transmit packet queues may be coupled to the second functional unit and the third port and may be configured to store packets received from a device coupled to the TS NIC for the respective NTS networks. A first NTS receive packet queue (of the plurality of NTS receive packet queues) and a first NTS transmit packet queue (of the plurality of NTS transmit packet queues) may each correspond to the NTS network.

In an exemplary embodiment, the first functional unit may be configured to insert a virtual local area network (VLAN) tag indicating the NTS network into each NTS packet received from the NTS network by the first port before routing each NTS packet to one or more other ports of the plurality of ports in the TS network switch, thereby generating tagged NTS packets. In addition, the first functional unit may be configured to remove the VLAN tag from each received VLAN tagged NTS packet before forwarding, via the first port, each received VLAN tagged NTS packet to the NTS node. Also, the first functional unit may be configured to receive, via the second port, one or more of the tagged NTS packets from the first port and forward, via the second port, the one or more tagged NTS packets to the TS NIC and receive, via the second port, tagged NTS packets from the TS NIC and route tagged NTS packets to the first port.

Additionally, in such embodiments, the second functional unit may be configured to queue tagged NTS packets received via the third port in the first NTS receive packet queue for subsequent provision to the device coupled to the TS NIC and queue NTS packets received from the device coupled to the TS NIC in the first NTS transmit packet queue and insert the VLAN tag indicating the NTS network into each NTS packet received from the first NTS transmit packet queue before forwarding, via the third port, each NTS packet to the second port, thereby generating tagged NTS packets.

In further embodiments, a TS network node may include the TS NIC. In other embodiments, the TS network node may include the TS network switch and the TS NIC and may be configured as a bridge between the TS network and the NTS network. In such embodiments, the system may further include one or more additional TS network nodes. Each TS network node of the one or more additional TS network nodes may include a respective TS network switch and TS NIC. Thus, a plurality of TS network nodes may include the TS network node and the one or more additional TS network nodes. Accordingly, in certain embodiments, each TS network node of the plurality of TS network nodes may be configured as a bridge between the TS network and a respective NTS network, thereby allowing interoperability between the TS network and a plurality of NTS networks.

In some embodiments, another one or more other ports of the plurality of ports of the TS network switch may each be configured to couple to a corresponding other NTS network via a respective NTS node of the corresponding other NTS network. In such other further embodiments, the first functional unit may be further configured to insert a VLAN tag into each NTS packet received by each of the another one or more other ports from the NTS node of the corresponding other NTS network before routing each NTS packet to one or more ports of the plurality of ports in the TS network switch, where the VLAN tag indicates the respective NTS network, thereby generating tagged NTS packets, and remove the VLAN tag from received VLAN tagged NTS packets before forwarding, via each of the another one or more other ports, each of the received VLAN tagged NTS packets to the respective NTS node of the corresponding other NTS network.

In accordance with the above, a method for interoperating between a TS network and an NTS network may include configuring a TS network switch and a TS NIC. The TS network switch may include a plurality of ports and a first functional unit coupled to the plurality of ports. Configuring the TS network switch may include configuring a first port of the plurality of ports to couple to an NTS node of the NTS network and configuring a second port of the plurality of ports to couple to a TS network interface controller (NIC).

In some embodiments, configuring the TS network switch may include configuring the first functional unit. Accordingly, the first functional unit may be configured to insert a VLAN tag indicating the NTS network into each NTS packet received from the NTS network by the first port before routing each NTS packet to one or more other ports of the plurality of ports in the TS network switch, thereby generating tagged NTS packets and remove the VLAN tag from each received VLAN tagged NTS packet before forwarding, via the first port, each received VLAN tagged NTS packet to the NTS node. Further, the first functional unit may be configured to receive one or more of the tagged NTS packets from the first port and forward, via the second port, the one or more tagged NTS packets to the TS NIC and receive, by the second port, tagged NTS packets from the TS NIC and route tagged NTS packets to the first port.

As noted above, TS NIC may include a second functional unit, a third port, coupled to the second functional unit, a plurality of NTS receive packet queues, coupled to the second functional unit and the third port, and a corresponding plurality of NTS transmit packet queues, coupled to the second functional unit and the third port. Accordingly, configuring the TS NIC may include configuring the second functional unit. In such embodiments, the second functional unit may be configured to queue tagged NTS packets received via the third port in the first NTS receive packet queue for subsequent provision to the device coupled to the TS NIC and queue NTS packets received from the device coupled to the TS NIC in the first NTS transmit packet queue and insert the VLAN tag indicating the NTS network into each NTS packet received from the first NTS transmit packet queue before forwarding, via the third port, each NTS packet to the second port, thereby generating tagged NTS packets.

In certain embodiments, the first functional unit may insert the VLAN tag indicating the NTS network into each NTS packet received by the first port from the NTS network before routing each NTS packet to one or more other ports of the plurality of ports in the TS network switch, thereby generating tagged NTS packets and removing the VLAN tag from each received VLAN tagged NTS packet by the first port before forwarding each received VLAN tagged NTS packet to the NTS node. Additionally, one or more of the tagged NTS packets may be received from the first port and forwarded, via the second port to the TS NIC. Similarly, tagged NTS packets from the TS NIC may be received by the first functional unit via the second port and routed to the first port.

In addition, the second functional may queue tagged NTS packets received via the third port in the first NTS receive packet queue for subsequent provision to the device coupled to the TS NIC. Additionally, NTS packets received from the device coupled to the TS NIC in the first NTS transmit packet queue may be queued. Accordingly, the VLAN tag indicating the NTS network may be inserted into each NTS packet received from the first NTS transmit packet queue before forwarding, via the third port, each NTS packet to the second port, thereby generating tagged NTS packets.

In other embodiments, the method may further include configuring each of another one or more other ports of the plurality of ports of the TS network switch to couple to a corresponding other NTS network via a respective NTS node of the corresponding other NTS network. In such other embodiments, the first functional unit may be further configured to insert a VLAN tag into each NTS packet received via each of the another one or more other ports from the NTS node of the corresponding other NTS network before routing each NTS packet to one or more ports of the plurality of ports in the TS network switch, where the VLAN tag indicates the respective NTS network, thereby generating tagged NTS packets and remove the VLAN tag from received VLAN tagged NTS packets before forwarding, via each of the another one or more other ports, each of the received VLAN tagged NTS packets to the respective NTS node of the corresponding other NTS network. Additionally, such an embodiment may further include coupling each of the another one or more other ports to the corresponding other NTS network via the respective NTS node of the corresponding other NTS network.

Further, the first functional unit may insert a VLAN tag into each NTS packet received via each of the another one or more other ports from the NTS node of the corresponding other NTS network before routing each NTS packet to one or more ports of the plurality of ports in the TS network switch, where the VLAN tag indicates the respective NTS network, thereby generating tagged NTS packets. Similarly, the VLAN tag from received VLAN tagged NTS packets may be moved before being forwarded, via each of the another one or more other ports, to the respective NTS node of the corresponding other NTS network.

In an exemplary embodiment, a TS network node for interoperating between a TS network and an NTS network may include a functional unit, a plurality of ports which may be coupled to the functional unit, a plurality of NTS receive packet queues which also may be coupled to the functional unit, and a corresponding plurality of NTS transmit packet queues which also may be coupled to the functional unit. Additionally, a first port of the plurality of ports may be configured to couple to an NTS node of the NTS network. Further, the plurality of NTS receive packet queues may be configured to store received packets from respective NTS networks and a first NTS receive packet queue may correspond to the NTS network. Similarly, the corresponding plurality of NTS transmit packet queues may be configured to store packets received from a device coupled to the TS NIC for the respective NTS networks and a first NTS transmit packet queue may correspond to the NTS network. Also, the functional unit may be configured to communicate tagged NTS packets with the TS network via a second port and insert a VLAN tag indicating the NTS network into each NTS packet received from the NTS network by the first port before routing each NTS packet to the second port, one or more other ports of the plurality of ports, or to the first NTS receive packet queue, thereby generating tagged NTS packets. The functional unit may also be configured to remove the VLAN tag from each VLAN tagged NTS packet received by the second port, the one or more other ports of the plurality of ports, or from the first NTS transmit packet queue before forwarding, via the first port, each received VLAN tagged NTS packet to the NTS node of the NTS network. In addition, the functional unit may be configured to queue at least a subset of tagged NTS packets received by the TS network node in the first NTS receive packet queue for subsequent provision to the device coupled to the TS network node and queue NTS packets received from the device coupled to the TS network node in the first NTS transmit packet queue and insert the VLAN tag indicating the NTS network into each NTS packet queued in the first NTS transmit packet queue before forwarding each NTS packet to the first port, thereby generating tagged NTS packets.

In one embodiment, a TS NIC may be configured to synchronize an NTS network timekeeper. In such embodiments, the TS NIC may include a functional unit, a port coupled to the functional unit, a clock, coupled to the functional unit and synchronized to a master clock, a plurality of input/output queue pairs, coupled to the functional unit and the port, and a time stamp unit (TSU) coupled to the clock and the functional unit. The plurality of input/output queue pairs may be for segregation of VLAN packets based on VLAN tags, wherein each input/output queue pair may correspond to a respective NTS network. In such an embodiment, the functional unit may be configured to, for each of the respective NTS networks, generate synchronization packets usable by an NTS network timekeeper of the respective NTS network to synchronize the NTS network to the master clock. In certain embodiments, generating synchronization packets may include using the TSU to generate time stamps for the synchronization packets in accordance with the clock synchronized to the master clock. Additionally, the functional unit may be configured to communicate with the respective NTS network via the port using the corresponding input/output queue pair, including sending the synchronization packets to the NTS network timekeeper of the respective NTS network. In certain embodiments, the functional unit may also be configured to egress the synchronization packets via the output queue of the at least one input/output queue pair based on a specified egress period, wherein the specified egress period specifies a time window and frequency for egressing the synchronization packets.

In some embodiments, the TS NIC may be included in a TS network node. Additionally, in certain embodiments, the TS network node may further include a TS network switch.

In another embodiment, the master clock may be a master clock of a TS network. In such embodiments, the master clock may be included in a TS network switch. In other embodiments, the master clock may be external to the TS network. In certain embodiments, the master clock may be an NTS network timekeeper. In some embodiments, the master clock may be synchronized to a global clock external to the TS network.

In yet another embodiment, the TSU may be included in the physical layer of the TS NIC.

In an exemplary embodiment, a method for the TS NIC to synchronize an NTS network timekeeper may include configuring the clock of the TS NIC to synchronize to the master clock. Additionally, the functional unit may be configured to, for each of the respective NTS networks, generate synchronization packets usable by an NTS network timekeeper of the respective NTS network to synchronize the NTS network to the master clock. In some embodiments, generating synchronization packets may include using a TSU to generate time stamps for the synchronization packets in accordance with the clock synchronized to the master clock. The functional unit may also be configured to communicate with the respective NTS network via the port using the corresponding input/output queue pair, including sending the synchronization packets to the NTS network timekeeper of the respective NTS network. Additionally, in certain embodiments, the functional unit may be configured to egress the synchronization packets via the output queue of the at least one input/output queue pair based on a specified egress period, wherein the specified egress period specifies a time window and frequency for egressing the synchronization packets.

In some embodiments of the method, the functional unit may generate synchronization packets usable by an NTS network timekeeper of the respective NTS network to synchronize the NTS network to the master clock, including using the TSU to generate time stamps for the synchronization packets in accordance with the clock synchronized to the master clock and communicate with the respective NTS network via the port using the corresponding input/output queue pair, including sending the synchronization packets to the NTS network timekeeper of the respective NTS network. Additionally, the synchronization packets may be egresses via the output queue of the at least one input/output queue pair based on a specified egress period, where the specified egress period specifies a time window and frequency for egressing the synchronization packets.

In another exemplary embodiment, a TS network switch for scheduled data egress may include a functional unit, a plurality of ports which may be coupled to the functional unit, and a plurality of queues which may be coupled to the plurality of ports and the functional unit. Each port may be associated with a respective set of network addresses for TS packets and may be configured with a respective set of egress periods. Each TS packet may have a destination address and a type that specifies a respective egress period, wherein each egress period specifies a respective time window and frequency for egressing TS packets to network nodes based on the type of the TS packets. Additionally, each queue may be associated with a respective TS packet type and a respective port of the plurality of ports.

In such an embodiment, the functional unit may be configured to receive one or more TS packets asynchronously from a network node via a first port and determine a second port of the plurality of ports for egressing at least one of the one or more the TS packets and the determination of the second port may be based on the destination address of the at least one TS packet. Further, the functional unit may be configured to determine an egress period for egressing the at least one TS packet and the determination of the egress period may be based on the type of the at least one TS packet. Also, the functional unit may be configured to determine that the at least one TS packet cannot currently be egressed from the second port. In certain embodiments, in order to determine that the at least one TS packet cannot currently be egressed from the second port, the functional unit may also be configured to determine that a respective time window for egress of the at least one TS packet is closed, determine that there is already a queued TS packet of the same type queued in the first queue for egress from the second port, or determine that the second port is currently egressing a TS packet.

Additionally, in response to determining that the at least one TS packet cannot currently be egressed, the functional unit may be configured to queue the at least one TS packet in a first queue of the plurality of queues based on the respective TS packet type and destination address and the first queue may be associated with the second port. In addition, the functional unit may egress the at least one TS packet in the respective time window from the second port.

In certain embodiments, the at least one TS packet may include two or more TS packets and the respective time window of the determined egress period may be specified to allow the egress of one of the two or more TS packets. In other embodiments, the at least one TS packet may include two or more TS packets and specifying the respective time window of the determined egress may include determining a quantity of the two or more TS packets to egress each egress period configuring the respective time window to allow the egress of the quantity each egress period.

In some embodiments, the first port may be configured to couple to an NTS node of an NTS network and the second port may be configured to couple to an NTS node of another NTS network.

In other embodiments, the first port may be configured to couple to a TS network node of a TS network and the second port may be configured to couple to an NTS node of a NTS network.

In one exemplary embodiment, a method for scheduled data egress may include providing the TS network switch which may include a functional unit, a plurality of ports which may be coupled to the functional unit, and a plurality of queues which may be coupled to the plurality of ports and the functional unit. The functional unit may be configured to receive one or more TS packets asynchronously from a network node via a first port and determine a second port of the plurality of ports for egressing at least one of the one or more the TS packets based on the destination address of the at least one TS packet. Additionally, the functional unit may be configured to determine an egress period for egressing the at least one TS packet based on the type of the at least one TS packet and determine that the at least one TS packet cannot currently be egressed from the second port. In certain embodiments, determining that the at least one TS packet cannot currently be egressed from the second port may include configuring the functional unit to determine that a respective time window for egress of the at least one TS packet is closed, determine that there is already a queued TS packet of the same type queued in the first queue for egress from the second port, or determine that the second port is currently egressing a TS packet.

Further, the functional unit may be configured to queue the at least one TS packet in the first queue of the plurality of queues based on the respective TS packet type and destination address in response to determining that the at least one TS packet cannot currently be egressed and egress the at least one TS packet in the respective time window from the second port.

In some embodiments of the method, the functional unit may receive one or more TS packets asynchronously from a network node via a first port and determine a second port of the plurality of ports for egressing at least one of the one or more the TS packets based on the destination address of the at least one TS packet. Additionally, an egress period for egressing the at least one TS packet based on the type of the at least one TS packet may be determined. It may also be determined that the at least one TS packet cannot currently be egressed from the second port. In certain embodiments, determining that the at least one TS packet cannot currently be egressed from the second port may include determining that a respective time window for egress of the at least one TS packet is closed, determining that there is already a queued TS packet of the same type queued in the first queue for egress from the second port, or determining that the second port is currently egressing a TS packet.

Further, the functional unit may queue the at least one TS packet in a first queue of the plurality of queues based on the respective TS packet type and destination address in response to determining that the at least one TS packet cannot currently be egressed. Accordingly, the at least one TS packet may be egressed in the respective time window from the second port.

BRIEF DESCRIPTION OF THE DRAWINGS

A better understanding of the present invention can be obtained when the following detailed description of the preferred embodiment is considered in conjunction with the following drawings, in which:

FIG. 15 is a flowchart diagram illustrating a method for scheduled data egress from a TS network switch according to one embodiment.

Figure 1:
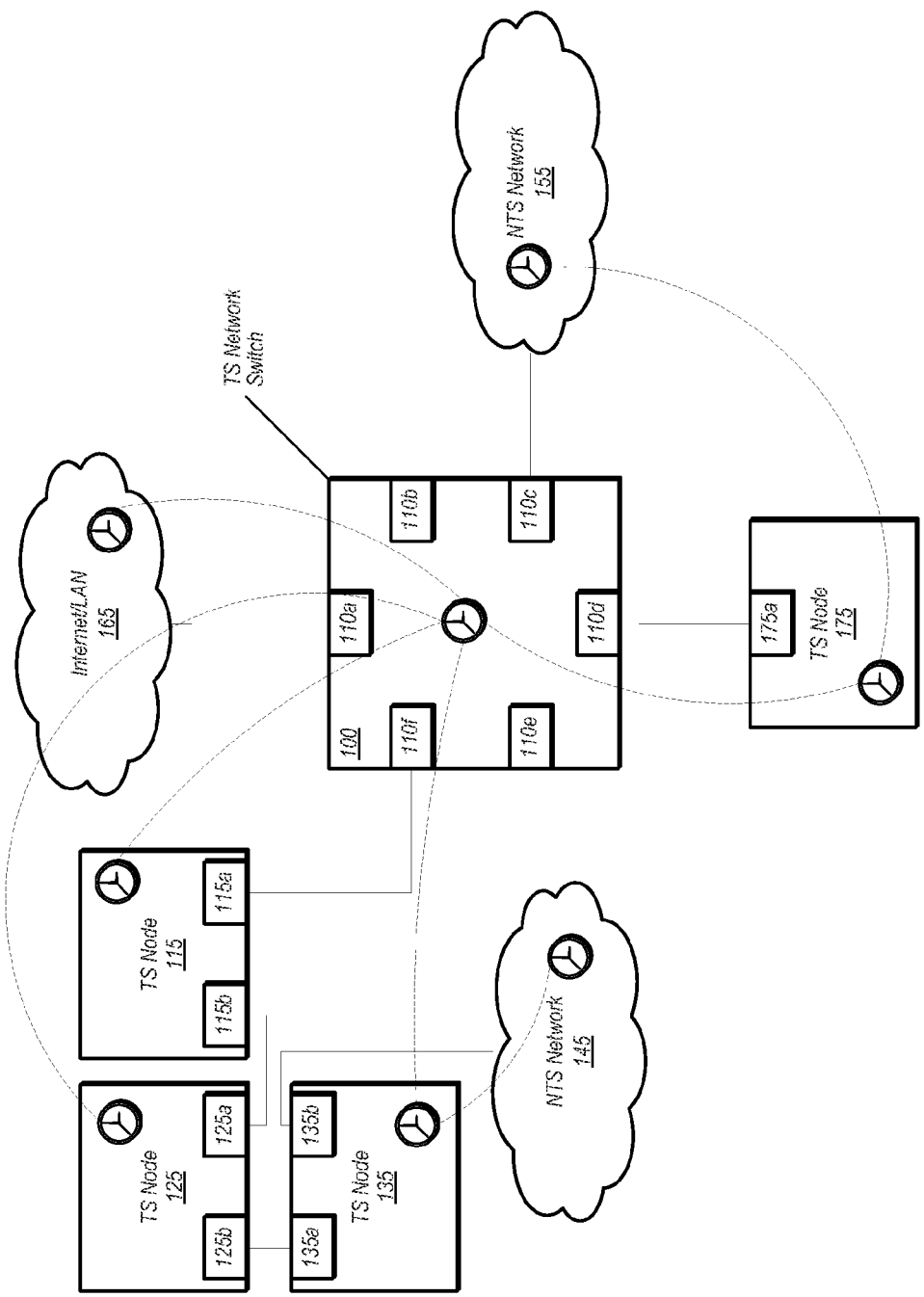
FIG. 1 is an exemplary block diagram of a TS network.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Terms

The following is a glossary of terms used in the present application:

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Internet Protocol (IP)—refers to the networking model and a set of protocols for communication used for networks such as the Internet.

Transmission Control Protocol (TCP)—refers to a core protocol of the internet protocol suite and provides delivery of a stream of octets between programs running on computers connected to a local area network, intranet, or the public Internet.

Ethernet—refers to a family of computer networking technologies for local area networks (LANs) as standardized in IEEE 802.3.

Non-Time-Sensitive (NTS) Network—refers to a real-time Ethernet network implementation such as PROFINET, which uses standards such as TCP/IP and Ethernet along with a mechanism for real time and isochronous real time communication, EtherCAT, which is an open high performance Ethernet-based fieldbus system, Ethernet/IP, which is designed for use in process control and other industrial automation applications, Ethernet Powerlink, which is a deterministic real-time protocol for standard Ethernet, among others.

Local Area Network (LAN)—refers to a computer network that interconnects computers in a limited geographical area such as an office building or office complex.

Virtual Local Area Network (VLAN)—refers to a computer network that is logically segmented on an organizational basis, in other words, segmentation is based on functions or applications rather than on a physical or geographic basis as is the case with LANs.

Media Access Control (MAC) Layer—refers to the sub-layer of a multi-layer computer network model which provides addressing and channel access control mechanisms that enable communication between multiple network nodes that share a common medium, such as Ethernet. MAC layer acts as an interface between the logical link control sub-layer and the network's physical (PHY) layer.

Time-Sensitive (TS) Network—refers to networks adhering to the IEEE 802.1 standard for real-time data transfer.

Time-Sensitive (TS) Packet—refers to specific packets of data routed through a TS network that contain time-sensitive data. May include packets from an NTS network with a VLAN tag inserted using embodiments of the present invention.

Isochronous—refers generally to events that occur regularly, or in other words, at equal time intervals.

Asynchronous—refers generally to events that occur irregularly, or in other words, at unscheduled and intermittent time intervals.

FIG. 1—Exemplary TS Network

FIG. 1 illustrates an exemplary block diagram of a time-sensitive (TS) network. The TS network switch 100 may be configured in accordance with various embodiments of the present invention as described below in more detail. Additionally, TS network nodes, such as TS network nodes 115, 125, 135, and 175 may be configured according to various embodiments as described below in more detail.

As FIG. 1 shows, in one embodiment, the TS network switch 100 may include a plurality of ports, e.g., 110*a* to 110*f*, coupled to a functional unit. The term functional unit is used in its broadest sense and refers to various elements or combinations of elements, such as, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

In certain embodiments, the TS network switch may be included in a system for interoperating between a TS network and a non-time-sensitive (NTS) network, such as NTS networks 145 and 155. The term non-time-sensitive network, or NTS network, refers to a proprietary real-time Ethernet implementation, such as PROFINET, which uses standards such as TCP/IP and Ethernet along with a mechanism for real time and isochronous real time communication, EtherCAT, which is an open high performance Ethernet-based fieldbus system, Ethernet/IP, which is designed for use in process control and other industrial automation applications, or Ethernet Powerlink, which is a deterministic real-time protocol for standard Ethernet, among others. Additionally, any reference to an NTS device, such as an NTS node or an NTS timekeeper, refers generally to a device that would be compatible with an NTS networks.

In such embodiments, a first port, such as port 110*c*, of the plurality of ports 110*a* to 110*f*, may be configured to couple to an NTS node of an NTS network, such as a node of NTS network 155. Furthermore, the functional unit may be configured to insert a virtual local area network (VLAN) tag indicating the NTS network, e.g., NTS network 155, into each NTS packet received from the NTS network by the first port, e.g., port 110*c*, before routing each NTS packet to one or more other ports of the plurality of ports, e.g., ports 110*a*, 110*b*, 110*d*, 110*e*, or 110*f*, in the TS network switch 100. Additionally, the functional unit may be configured to remove the VLAN tag from each received VLAN tagged NTS packet before forwarding, via the first port (port 110*c*) each received VLAN tagged NTS packet to the NTS node of the NTS network, e.g., NTS network 155.

In some embodiments, a second port, such as port 110*d* or 110*f*, may be configured to couple to a TS network interface controller (NIC), such as the TS NIC included in TS network nodes 115 and 175. In such embodiments, the functional unit may be configured to receive, via the second port, one or more of the tagged NTS packets from the first port and forward, via the second port, the one or more tagged NTS packets to the TS NIC. Additionally, the functional unit may be configured to receive, via the second port, tagged NTS packets from the TS NIC and route tagged NTS packets to the first port.

In some embodiments, the functional unit of the TS network switch 100 may be coupled to a plurality of queues which may also be coupled to the plurality of ports. Additionally, in some embodiments, each port may be associated with a respective set of network addresses for TS packets. Also, each TS packet may have a destination address and a type that specifies a respective egress period. An egress period may specify a respective time window and frequency for egressing TS packets to network nodes based on the type of the TS packets. Further, each queue may be associated with a respective TS packet type and a respective port of the plurality of ports of the TS network switch 100.

In certain embodiments, the functional unit may be configured to receive one or more TS packets asynchronously from a network node, such as, for example, TS network node 115 or 175 or an NTS node of NTS network 155, via a first port, such as port 110*c*, 110*d*, or 110*f*. Additionally, the functional unit may be configured to determine a second port for egressing at least one of the one or more TS packets based on the destination address of the at least one TS packet, and in some embodiments, determine an egress period for egressing the at least one TS packet based on the type of the at least one TS packet. Subsequently, the functional unit may be configured to determine that the at least one TS packet cannot currently be egressed from the second port and, in response, the functional unit may queue the at least one TS packet in a first queue of the plurality of queues based on the respective TS packet type and destination address, where the first queue may be associated with the second port. Finally, the functional unit may egress the at least one TS packet in the respective time window from the second port.

In some embodiments, the TS network node, e.g., TS network node 135 or 175, may include a TS NIC. In other embodiments, the TS network node, e.g., TS network node 115 or 125, may include a TS NIC and a TS network switch. In certain embodiments, the TS NIC may include a plurality of NTS receive packet queues and a corresponding plurality of NTS transmit packet queues, a port, and a functional unit. The TS NIC may be configured to couple to a port of a TS network switch via the port of the TS NIC, such as the coupling of port 175*a* of TS network node 175 to port 110*d* of TS network switch 100, or the coupling of port 115*a* of TS network node 115 to port 110*f* of TS network switch 100, or port 125*a* of TS network node 125 to port 115*b* of TS network node 115, or port 135*a* of TS network node 135 to port 125*b* of TS network node 125. Additionally, in some embodiments, the functional unit of the TS NIC may be configured to queue tagged NTS packets received via the port in an NTS receive packet queue corresponding to an NTS network, such as NTS network 145 or 155, for subsequent provision to a device coupled to the TS NIC. Also, the functional unit of the TS NIC may be configured to queue NTS packets received from a device coupled to the TS NIC for the respective NTS networks.

In certain embodiments, the TS NIC may also include a clock, such as the clocks illustrated in TS network nodes 115, 125, 135, and 175. The clock may be synchronized to a master clock, such as the clock illustrated in TS network switch 100, e.g., a TS network master clock. In turn, the master clock, such as the TS network master clock illustrated in TS network switch 100, may be synchronized to a global clock accessible via a local area connection (LAN) or the Internet, such as the clock of Internet/LAN 165. In other embodiments, the master clock may be a clock eternal to the TS network, such as a clock of an NTS network timekeeper. Additionally, the TS NIC may include a plurality of queue pairs for segregation of VLAN packets based on VLAN tags as described above. In some embodiments, each queue pair may include an input/output queue pair and at least one queue pair may correspond to a NTS network, such as NTS network 145 or 155. Further, the TS NIC may include a time stamp unit (TSU) coupled to the clock. In some embodiments, the TSU may be configured to communicate with the NTS network via the at least one queue pair and synchronize a clock of an NTS timekeeper, such as the clocks illustrated as part of NTS networks 145 and 155. As used herein, a timekeeper is a clock that is synchronized to a master clock. In certain embodiments, the TSU may be configured to generate time stamps for synchronization packets in accordance with the clock synchronized to the master clock. In such embodiments, the synchronization packets may be usable by an NTS network timekeeper to synchronize the NTS network to the master clock.

FIGS. 2-9: Systems and Methods for Interoperability Between Networks

Embodiments of the systems and methods described herein may allow for the interoperability between time-sensitive (TS) networks, e.g., networks conforming to the IEEE 802.1 standard for real-time data transfer, and non-time sensitive (NTS) networks, e.g., real-time data transfer networks not conforming to the IEEE 802.1 standard for real-time data transfer. Examples of NTS networks include PROFINET, which uses standards such as TCP/IP and Ethernet along with a mechanism for real time and isochronous real time communication, EtherCAT, which is an open high performance Ethernet-based fieldbus system, Ethernet/IP, which is designed for use in process control and other industrial automation applications, Ethernet Powerlink, which is a deterministic real-time protocol for standard Ethernet, among others. As mentioned previously, NTS networks are not generally interoperable among themselves or with TS networks due to the proprietary implementation of the media access control (MAC) layer of each NTS network. Embodiments of the systems and methods below allow for such interoperability between TS and NTS networks and also amongst NTS networks.

Figure 2:
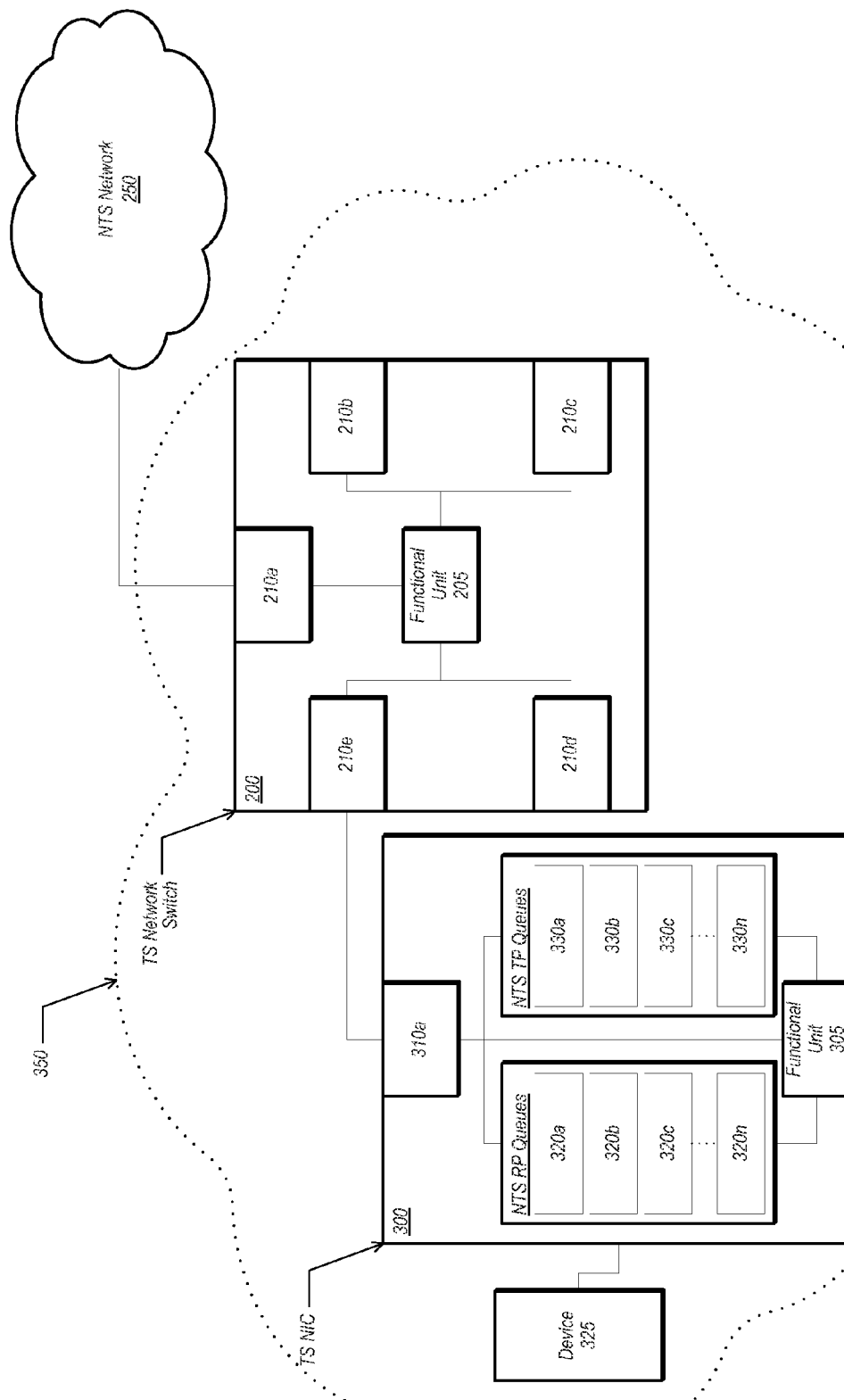
FIG. 2 is an exemplary block diagram of a system for allowing interoperability between networks.
Figure 3:
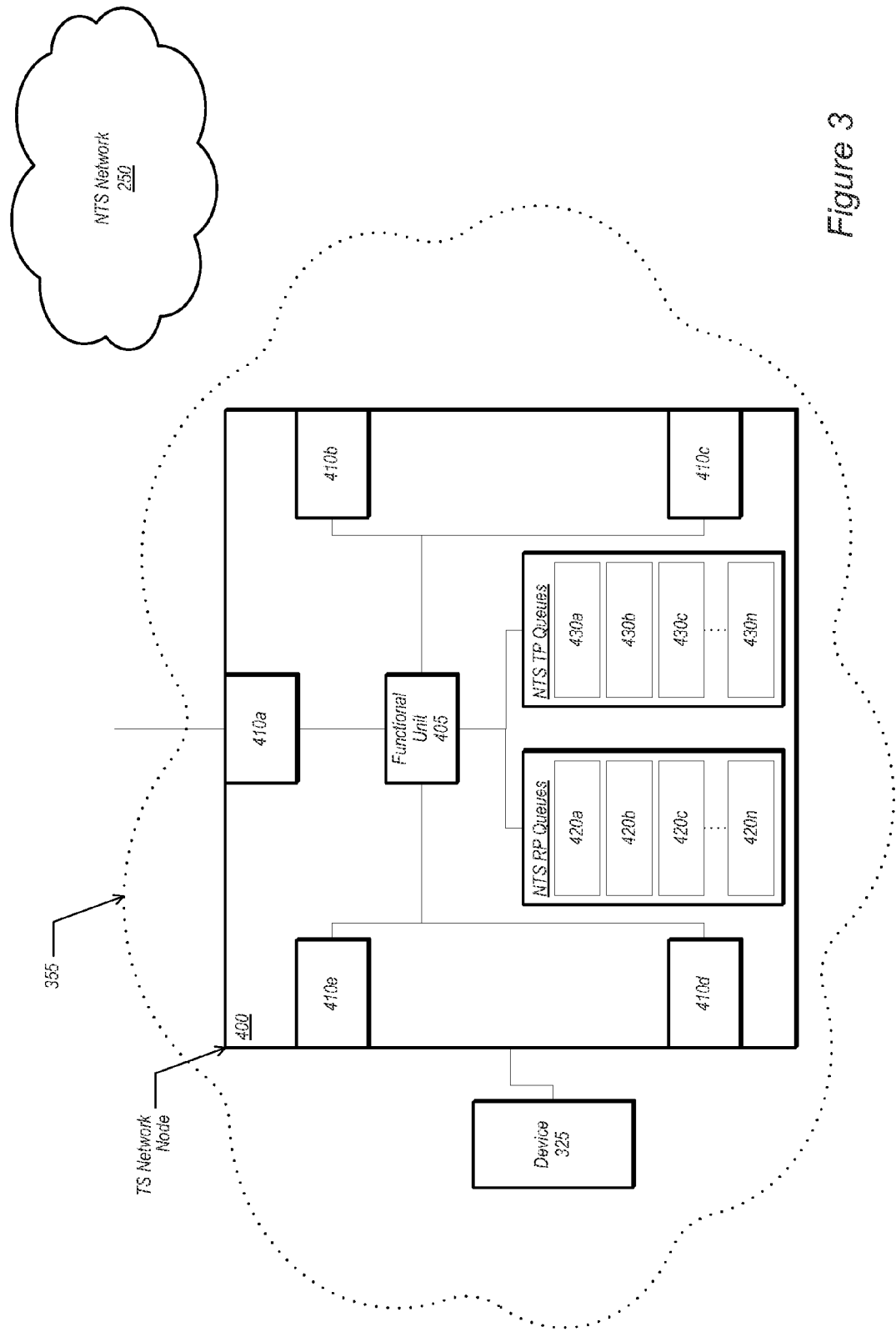
FIG. 3 is an exemplary block diagram of a system for allowing interoperability between networks.

FIGS. 2-3: Exemplary Systems for Interoperability Between Networks

FIG. 2 is a block diagram of an exemplary system for interoperability between networks, such as TS network 350 and NTS network 250. It should be noted that although TS network 350 is illustrated as encompassing TS network switch 200, TS NIC 300, and device 325, it is envisioned that TS network 350 may include one or more TS network switches, one or more TS network nodes, such as TS NICs, and one or more devices. In some embodiments the system for interoperating between a TS network, such as TS network 350, and an NTS network, such as NTS network 250, may include a TS network switch, such as TS network switch 200, and a TS NIC, such as TS NIC 300.

In an exemplary embodiment, the TS network switch 200 may include a plurality of ports 210a-210e and a functional unit 205 coupled to the plurality of ports. A first port, e.g., port 210a, may be configured to couple to an NTS node of an NTS network, such as NTS network 350. The functional unit 205 may be configured to insert a VLAN tag indicating NTS network 350 into each NTS packet received from NTS network 250 by port 210a, before routing each NTS packet to one or more other ports of the plurality of ports, e.g., ports 210b-210e, thereby generating tagged NTS packets. Further, the functional unit 205 may be configured to remove the VLAN tag from each received VLAN tagged NTS packet before forwarding, via the first port, each received VLAN tagged NTS packet to the NTS node of NTS network 250.

Additionally, a second port, such as port 210e, may be configured to couple to a TS NIC, such as TS NIC 300. The functional unit 205 may be configured to receive, via the second port, one or more of the tagged NTS packets from the first port (e.g., port 210a), and forward, via the second port, the one or more tagged NTS packets to the TS NIC. Additionally, the functional unit 205 may be configured to receive, via the second port, tagged NTS packets from the TS NIC and route tagged NTS packets to the first port.

Further, the TS NIC, e.g., TS NIC 300, may include a plurality of NTS receive packet queues, e.g., queues 320a-320n. Each NTS receive packet queue may be configured to store received packets from respective NTS networks. For example, a first NTS receive packet queue, such as NTS receive packet queue 320a of TS NIC 300, may be configured to store packets received from the NTS network, e.g., NTS network 250. Additionally, the TS NIC may include a corresponding plurality of NTS transmit packet queues, e.g., queues 330a-330n. Each NTS transmit packet queue may be configured to store packets received from a device, such as device 325, coupled to the TS NIC for the respective NTS networks. Thus, for example, NTS transmit packet queue 330a may correspond to queue 320a and store packets for transmission to NTS network 250.

Note that device 325 may be or include instruments, data acquisition devices, smart sensors, and any of various types of devices that are configured to acquire and/or store data. In other words, device 325 may be or include a measurement device or multiple measurement devices.

In certain embodiments, additional ports of the TS network switch, e.g., one or more other ports of the plurality of ports of the TS network switch, such as ports 210b-210d of TS network switch 200, may each be configured to couple to a corresponding other NTS network, e.g., an NTS network other than the NTS network coupled to the first port. In other words, exemplary ports 210b-210d may be configured to couple to a corresponding NTS network. In such embodiments, functional unit 205 may be further configured to insert a VLAN tag into each NTS packet received by each of the additional ports from the NTS node of the corresponding NTS network before routing each NTS packet to one or more ports of the plurality of ports in the TS network switch. In these embodiments, the VLAN tag indicates the respective, or corresponding, NTS network. Additionally, functional unit 205 may be configured to remove the VLAN tag from received VLAN tagged NTS packets before forwarding, via the appropriate additional port, each of the received VLAN tagged NTS packets to the respective NTS node of the corresponding NTS network. In this manner, interoperability between the TS network and a plurality of NTS networks may be achieved.

Additionally, the TS NIC may include a functional unit 305 coupled to the plurality of received packet queues 320a-320n, and the plurality of transmit packet queues 330a-330n. Also, the TS NIC may include a port 310a coupled to the functional unit, the plurality of received packet queues 320a-320n, and the plurality of transmit packet queues 330a-330n. In some embodiments, a TS network node may include the TS NIC 300. In other embodiments, a TS network node may include both the TS NIC 300 and the TS network switch 200.

In an exemplary embodiment, the functional unit 305 of the TS NIC 300 may be configured to queue tagged NTS packets received via port 310a in NTS receive packet queue 320a for subsequent provision to device 325. Additionally, the functional unit 305 may be configured to queue NTS packets received from device 325 in NTS transmit packet queue 330a and insert the VLAN tag indicating NTS network 250 into each packet received from NTS transmit packet queue before forwarding, via port 310a, each NTS packet to port 210e of TS network switch 200, thereby generating tagged NTS packets.

In further embodiments, a TS network node may include a TS NIC, such as TS NIC 300. Additionally, the TS network node may include a device, such as device 325. In an exemplary embodiment, the device may be or include an embedded device. The embedded device may include one or more measurement devices.

Further, in some embodiments, the TS network node may include both a TS NIC, such as TS NIC 300, and a TS network switch, such as TS network switch 200. In such embodiments, the TS network node may also include a device, such as device 325. In an exemplary embodiment, the device may include an embedded device. In some embodiments, the embedded device may include one or more measurement devices. Additionally, in some embodiments, the TS network node may be configured as a bridge between a TS network and an NTS network. The system may further include one or more additional TS network nodes, which in conjunction with the TS network node, form a plurality of TS network nodes. Each TS network node may include a TS NIC and a TS network switch with the functionalities disclosed above, and each TS network node of the plurality of TS network nodes may be configured as a bridge between the TS network and a respective NTS network. In other words, each TS network node may be coupled to an NTS network, and thus, there may be a corresponding NTS network for each TS network node. In this manner, interoperability between the TS network and a plurality of NTS networks may be achieved.

FIG. 3 is a block diagram of another exemplary system for interoperability between networks, such as TS network 355 and NTS network 250. Note that blocks with similar or the same functionality as blocks previously described above in reference to FIG. 2 are labeled similarly. Thus, NTS network 250 may have the same or similar functionality as NTS network 250 of FIG. 2. Similarly, device 325 of FIG. 2 may have the same or similar functionality as device 325 of FIG. 3.

In an exemplary embodiment, a time-sensitive (TS) network node 400 for interoperating between a TS network, e.g., TS network 355, and an NTS network, e.g., NTS network 250, may include a functional unit 405 and a plurality of ports, e.g., ports 410*a*-410*e*, coupled to functional unit 405. A first port, e.g., port 410*a*, may be configured to couple to an NTS network node of NTS network 250. Additionally, TS network node 400 may include a plurality of NTS receive packet queues, e.g., queues 420*a*-420*n*, coupled to functional unit 405. The NTS receive packet queues may be configured to store received packets from respective NTS networks, where a first NTS receive packet queue, e.g., NTS receive packet queue 420*a*, corresponds to NTS network 250. TS network node 400 may further include a plurality of NTS transmit packet queues, e.g., queues 430*a*-430*n*, coupled to functional unit 405. The NTS transmit packet queues may be configured to store packets received from a device coupled to TS network node 400, such as device 325. Thus, for example, NTS transmit packet queue 430*a* may correspond to queue 420*a* and store packets for transmission to NTS network 250.

In some embodiments, functional unit 405 may be configured to communicate tagged NTS packets with the TS network 355 via a second port, e.g., one of ports 410*b*-410*e*. In such embodiments, the second port, e.g., port 410*b*, may be configured to couple to another TS network node of the TS network and functional unit 405 may forward NTS packets received from NTS network 250 to the TS network via the second port. Additionally, the second port, e.g., port 410*b*, may be configured to receive NTS packets from the TS network and the functional unit may forward the NTS packets received via the second port to the first port.

Further, functional unit 405 may be configured to insert a VLAN tag indicating NTS network 250 into each NTS packet received from the NTS network by the first port, e.g., port 410*a*, before routing each NTS packet to either the second port, e.g., port 410*b*, one or more other ports of the plurality of ports, e.g., ports 410*c*-410*e*, or to the first NTS receive packet queue, e.g., queue 420*a*, thereby generating tagged NTS packets. Also, the functional unit may be configured to remove the VLAN tag from each VLAN tagged NTS packet received by the second port (e.g., port 410*b*), the one or more other ports (e.g., ports 410*c*-410*e*), or from the NTS transmit packet queue that corresponds to the first NTS receive packet queue, e.g., queue 430*a*, before forwarding, via the first port (e.g., port 410*a*), each received VLAN tagged NTS packet to the NTS node of NTS network 250.

In certain embodiments, functional unit 405 may be configured to queue at least a subset of tagged NTS packets received by TS network node 400 in NTS receive packet queue 420*a* for subsequent provision to device 325. Additionally, functional unit 405 may be configured to queue NTS packets received from device 325 in NTS transmit packet queue 430*a* before forwarding each NTS packet to port 410*a*, thereby generating tagged NTS packets.

It should be noted that the number and labels of the various ports, queues, and networks disclosed herein are exemplary only, and are not intended to limit the ports, queues, and networks to any particular number, form, or function.

FIGS. 4-8: Exemplary Implementations of Devices and Systems for Interoperability Between Networks FIGS. 4 through 8 illustrate implementations of embodiments of the present techniques to allow interoperability between networks. The implementations described herein are for explanation purposes only and are not intended to limit the scope of the present invention to any particular form, architecture, or functionality. Each implementation may use all or a portion of the embodiments described above in reference to FIGS. 1-3.

Figure 4:
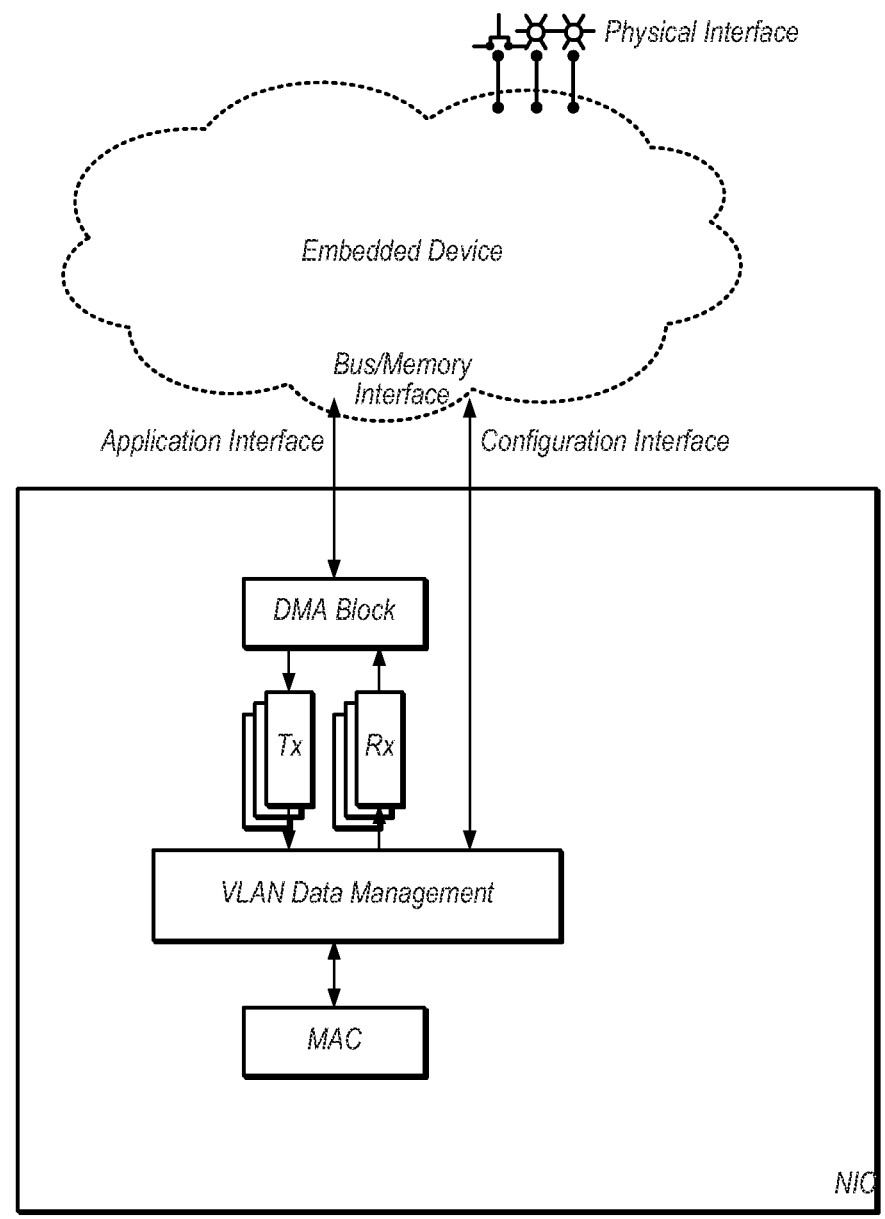
FIG. 4 is an exemplary block diagram of a TS network interface controller (NIC) according to one embodiment.

FIG. 4 is a high level block diagram of an exemplary implementation of a TS network interface controller (NIC) with support for a TS network. In some embodiments, the TS NIC may be included in a TS network node. Additionally, the TS network node may include or be coupled to a device, such as a measurement device. In some embodiments, the device may include an embedded device which may include a physical interface and a bus/memory interface, including an application and configuration interface.

The TS NIC may include a functional unit configured to implement the logic described herein. For example, the functional unit may be configured to control the VLAN data management block as well as the dynamic memory access (DMA) block. Additionally, the functional unit may be coupled to and communicate with the physical layer (PHY), the media access layer (MAC), and time stamp unit(s) (TSU) of the TS NIC. Note that in some embodiments, the PHY may include a TSU.

In some embodiments, the functional unit, via the VLAN data management block, may segregate traffic based on VLAN tags, such as the VLAN tags described above. The VLAN data management block may be coupled to a plurality of transmit (Tx) queues and a plurality of receive (Rx) queues. In some embodiments, a subset of the Tx queues may include a plurality of NTS transmit packet queues. Similarly, a subset of the Rx queues may include a plurality of NTS receive packet queues. The DMA block may be configured via software to read and write data to the embedded device via the application interface. Data received by the NIC, such as tagged NTS packets, are routed to the VLAN Data Management block which segregates the data into the appropriate Rx queue. Then, the DMA block may read the data from the Rx queue and write the data to the embedded device. Additionally, the embedded device may generate data which is read by the DMA block and written to the appropriate Tx queue.

Figure 5:
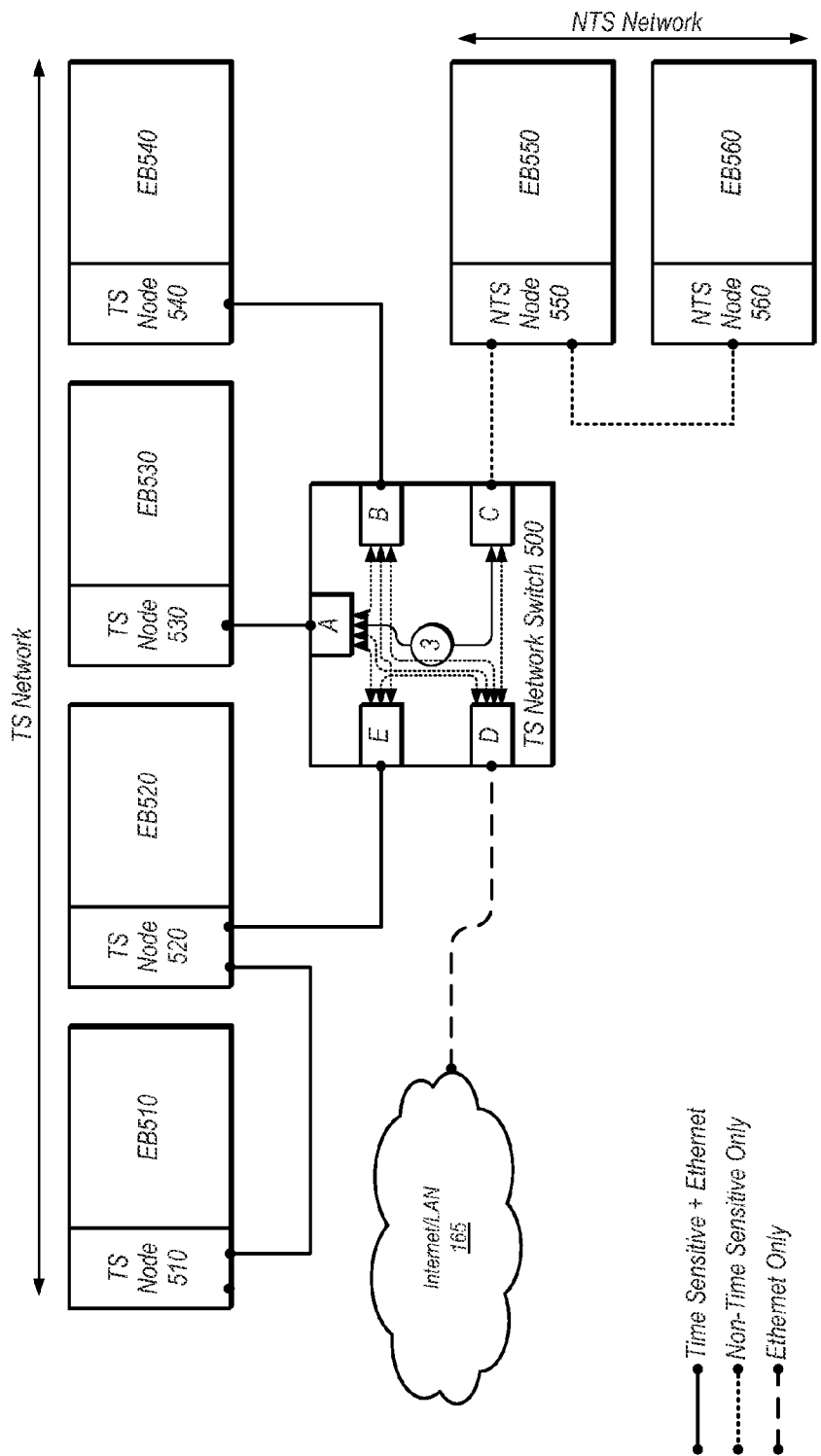
FIG. 5 illustrates an exemplary system for routing of tagged VLAN packets according to one embodiment.

FIG. 5 is an example topology of a system allowing interoperability between a TS network and an NTS network, although the topology shown, and the various elements included therein, are meant to be exemplary only. The TS network may include a TS network switch which allows the interoperability between the TS and the NTS network. The TS network switch may include any features, in any combination, of the embodiments described above in reference to TS network switches 100, 200, and 400. The TS network switch 500 may include multiple ports, e.g., ports A-E. In the embodiment shown, ports A, B, and E are each coupled to a TS network node. Port A may be coupled to TS node 530 which may be similar and have the same or similar functionality to TS NIC 300 or the functionality described above in reference to the TS NIC of FIG. 4. In this particular example, TS node 530 may be coupled to embedded device EB530. Note, however, that TS node 530 may alternatively include embedded device EB530. Similar to port A, port B may be coupled to TS node 540, where TS node 540 may have similar or the same functionality as TS node 530. TS node 540 may be coupled to or include embedded device EB540. Additionally, port E may be coupled to TS node 520. TS node 520 may include both a TS NIC and a TS network switch. The TS NIC of TS node 520 may be coupled to or include embedded device EB520. Further, as disclosed above, TS node 520 may have multiple functional units or a single functional unit. In other words, TS node 520 may include a first functional unit to control the TS network switch and a second functional unit to control the TS NIC or TS node 520 may have a single functional unit to control both the TS NIC and TS network switch. Also, TS node 520 may be configured as a bridge and may be coupled to TS node 510 via a port of the TS network switch of TS node 520. TS node 510 may be similar to TS node 520 and include both a TS NIC and TS network switch. Embedded device EB510 may be included in or coupled to TS node 510.

Ports D and C of the TS network switch may be coupled to networks or nodes other than TS networks or TS network nodes. For example, port D may be coupled to an Ethernet network, such as Internet/LAN 165 whereas port C may be coupled to an NTS node of an NTS network, such as NTS node 550. NTS node 550 may include or be coupled to embedded device EB550. Further, NTS node 550 may be configured as a bridge to NTS node 560 which may be coupled to or include embedded device EB560. In other words, NTS node 510 may include both a NIC and a switch.

In order to allow interoperability between the TS network, e.g., TS nodes 510-540, and the NTS network, e.g., NTS nodes 550 and 560, TS network switch 500 may include or implement embodiments of the invention as described above. For example, a functional unit of TS network switch 500 may be configured to insert a VLAN tag into each packet received via port C. In other words, each packet received from the NTS network would be tagged, for example with "VLAN 3". Further, the functional unit of the TS network switch may be configured to remove VLAN tags from each packet received via port A before forwarding each packet to the NTS network via port C. Thus, packets received via port A and containing the tag "VLAN 3" would have the tag removed prior to the packet being forwarded to the NTS network via port C. Note that in the configuration as described, only port A may egress packets tagged with "VLAN 3", e.g., packets received from the NTS network via port C. All other ports are configured to discard packets with the "VLAN 3" tag.

As previously mentioned, each TS network node may be configured with any of the features of the embodiments described above. For example, TS node 530, coupled to port A, may include a functional unit configured to segregate and queue network packets based on VLAN tags. Thus, the TS NIC of TS node 530 may include a plurality of NTS receive packet queues and each NTS receive packet queue may be configured to store received packets from respective NTS networks, including a first NTS receive packet queue configured to store packets received from the NTS network. Additionally, the TS NIC may include a corresponding plurality of NTS transmit packet queues, and each NTS transmit packet queue may be configured to store packets received from EB530 for the respective NTS networks. Thus, a first NTS transmit packet queue may correspond to the first NTS receive packet queue and store packets for transmission to the NTS network. Also, the functional unit of the TS node 530 may be coupled to the plurality of NTS receive packet queues and the plurality of NTS transmit packet queues and configured to queue tagged NTS packets received from port A in the first NTS receive packet queue for subsequent provision to EB530. Additionally, the functional unit may be configured to queue NTS packets received from EB530 in the first NTS transmit packet queue and insert the VLAN tag indicating the NTS network, e.g., "VLAN 3," into each packet received from the first NTS transmit packet queue before forwarding the NTS packet to port A of TS network switch 500.

Figure 6:
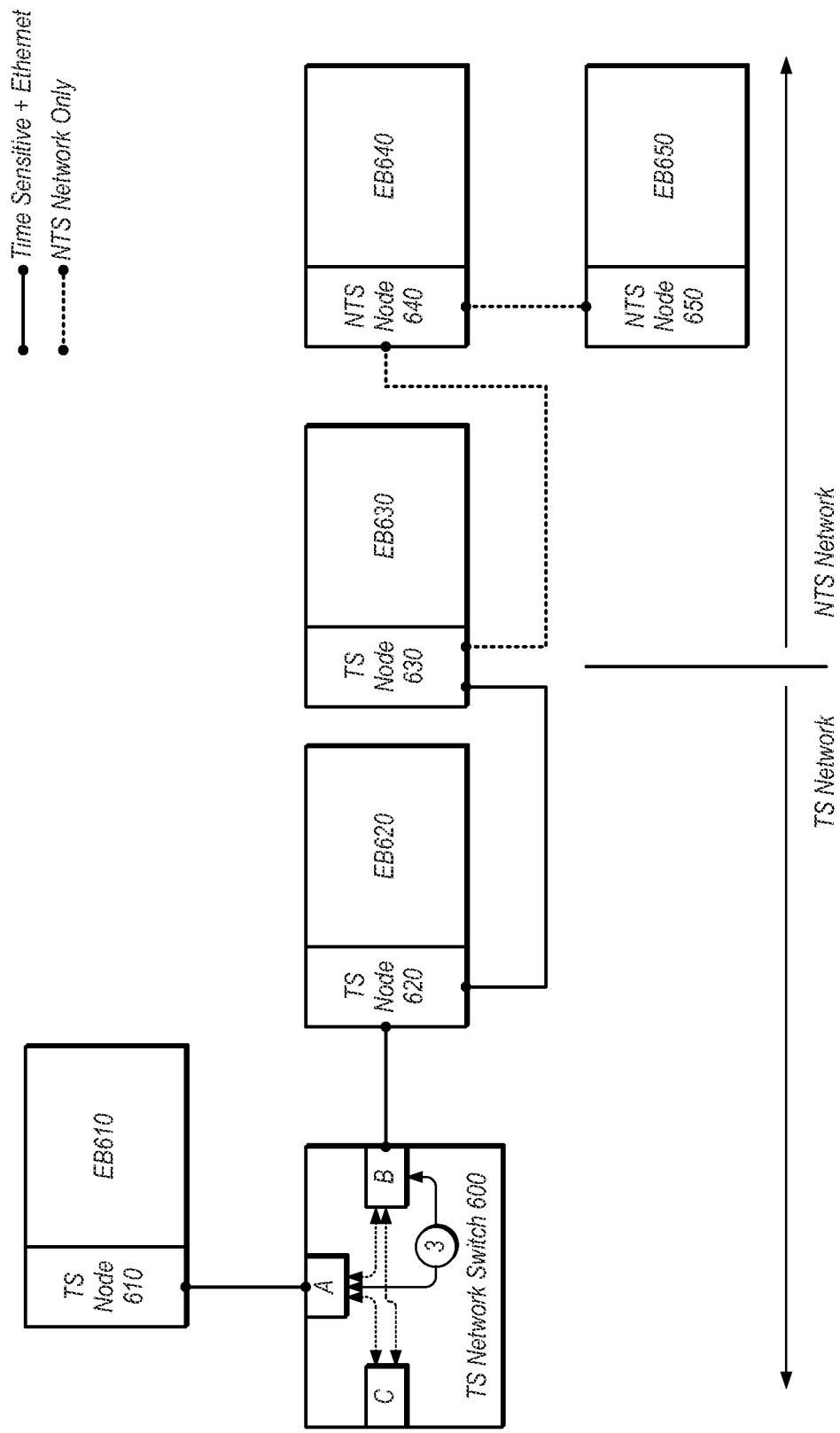
FIG. 6 illustrates an exemplary system for routing of tagged VLAN packets according to another embodiment.

FIG. 6 is an example of an alternate topology of a system allowing interoperability between a TS network and an NTS network. In such a topology, the TS network may include one or more TS network nodes and switches, such as TS nodes 610-630 and TS network switch 600. Note that embedded devices EB610-630 may be included in or coupled to respective TS nodes 610-630. Additionally, as shown, TS node 630 may be configured as a bridge between the TS network and the NTS network, which may include NTS nodes 640-650 where embedded devices EB640 and EB650 are included in or coupled to respective NTS nodes 640 and 650. In order for TS node 630 to function as a bridge between the TS and NTS networks, it may include both a TS network switch and TS NIC configured with embodiments of the present invention to allow VLAN tagging of NTS packets received from the NTS network, e.g., NTS node 640. Additionally, TS node 620 may also include a TS network switch and TS NIC configured with embodiments of the present invention to allow forwarding of VLAN tagged NTS packets to other destinations within the TS network, such as TS node 610 via TS network switch 600, which each may include embodiments of the present invention to allow forwarding and segregation of VLAN tagged NTS packets.

Figure 7:
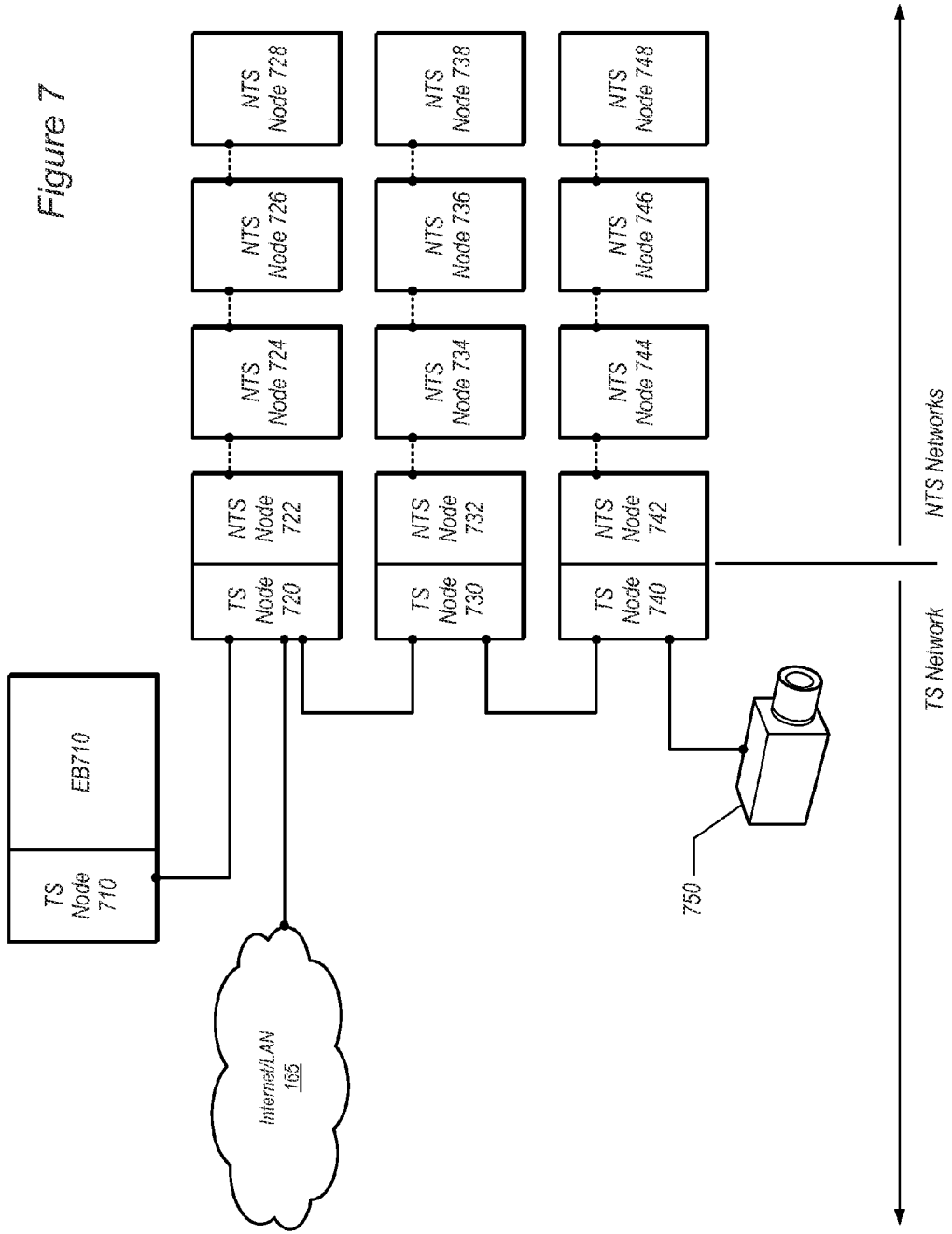
FIG. 7 illustrates an exemplary system for routing of tagged VLAN packets according to an embodiment.

FIG. 7 is an example topology of another alternate system allowing interoperability between a TS network and NTS networks. In such a topology, the system may include multiple TS network nodes, each coupled to a respective NTS network. Thus, for example, TS node 720 may be coupled to an NTS network that includes NTS nodes 722-728, TS node 730 may be coupled to an NTS network that includes NTS nodes 732-738, and TS node 740 may be coupled to an NTS network that includes NTS nodes 742-748. Additionally, each NTS network may be assigned a specific VLAN tag indicating the NTS network. For example, packets received from NTS node 722 may be tagged with a "VLAN 2" tag whereas packets received from NTS node 732 may be tagged with a "VLAN 3" tag and packets received from NTS node 742 may be tagged with a "VLAN 4" tag. Further, each of the TS nodes 720-740 may include both a TS NIC and a TS network switch, each configured according to an embodiment of the present invention allowing for the management of tagged NTS packets. Also, TS node 710, which may be coupled to or include embedded device 710, may be configured according to an embodiment of the present invention to manage NTS packets received from each of the respective NTS networks. Thus, TS node 710 may be configured with a respective NTS receive packet queue and a respective NTS transmit packet queue for each respective NTS network. In other words, TS node 710 may include a send/receive queue pair associated with each VLAN tag, e.g., a send/receive queue pair for "VLAN 2" tagged packets, a send/receive queue pair for "VLAN 3" tagged packets, and a send/receive queue pair for "VLAN 4" tagged packets. Additionally, TS node 710 may include a send/receive queue pair for TS packets, such as those generated by real-time camera 750 and a send/receive queue pair for Ethernet packets, such as those received via TS node 720 from Internet/LAN 165.

Figure 8:
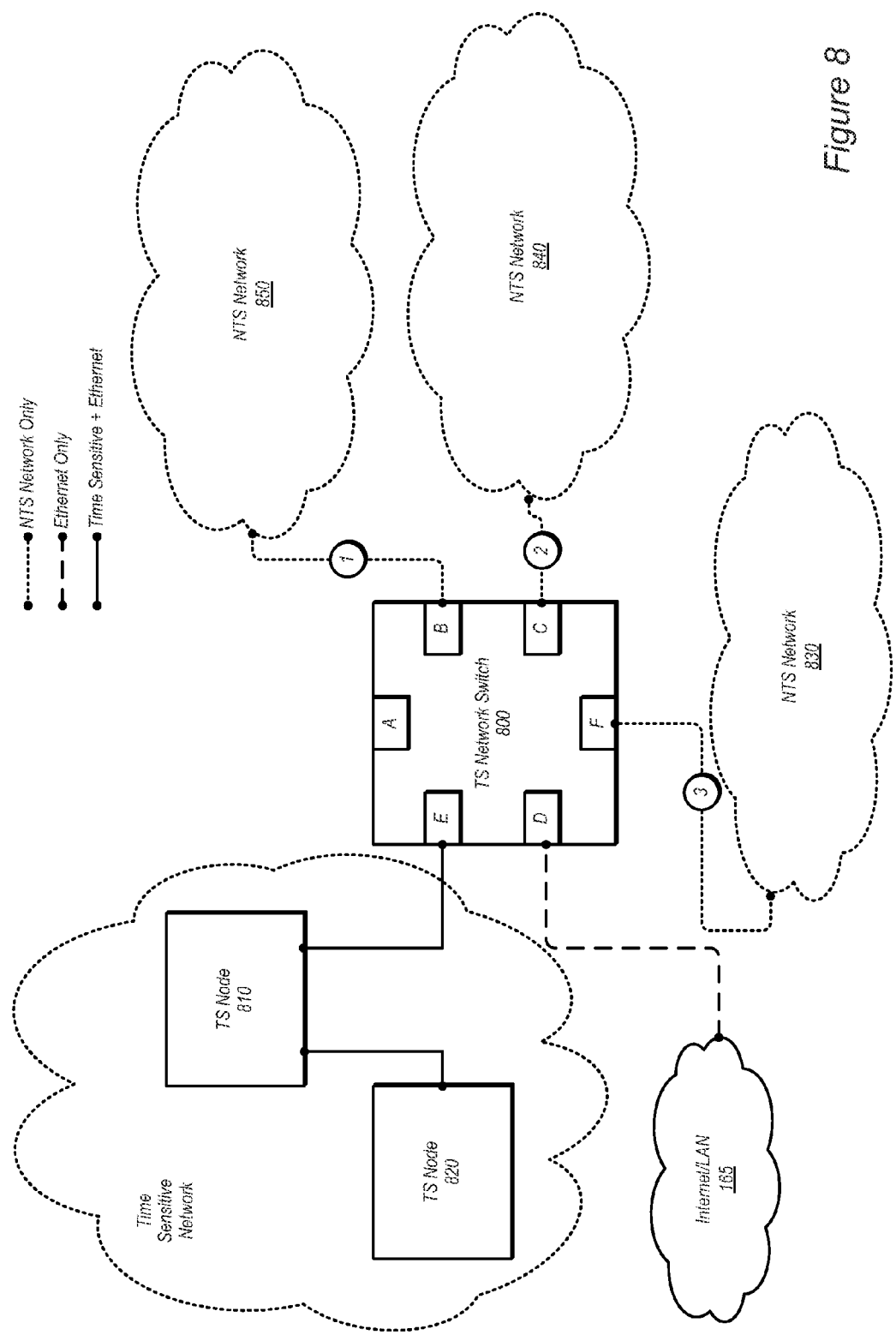
FIG. 8 illustrates an exemplary system for routing of tagged VLAN packets according to an embodiment.

FIG. 8 is an example topology of yet another alternate system allowing interoperability between a TS network and NTS networks. In such a system, the interoperability between the TS network and the NTS networks is managed by TS network switch 800 configured in accordance with an embodiment of the present invention. Thus, TS network switch 800 may be configured to tag packets received from NTS network 830 with a "VLAN 3" tag, packets received from NTS network 840 with a "VLAN 2" tag, and packets received from NTS network 850 with a "VLAN 1" tag. Also, similar to TS node 710, TS nodes 810 and 820 may be configured to segregate packets received from and destined for each NTS network in respective send/receive queue pairs while also segregating TS network packets and Ethernet packets received via TS network switch 800 from Internet/LAN 165.

Figure 9:
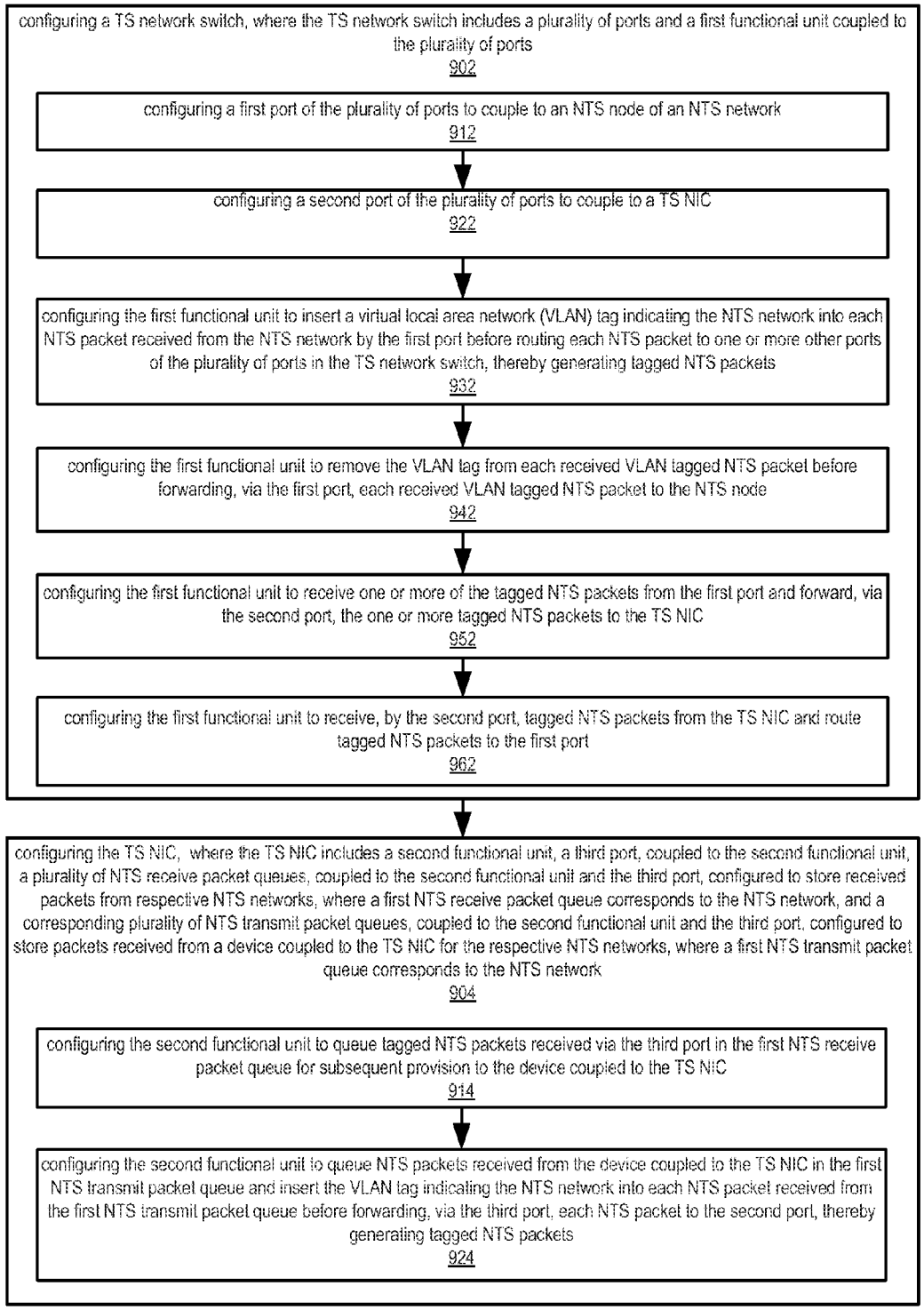
FIG. 9 is a flowchart diagram illustrating a method for routing of tagged VLAN packets according to one embodiment.

FIG. 9-Flowchart of a Method for Interoperating Between a TS Network and an NTS Network FIG. 9 illustrates a method for interoperating between a TS network and an NTS network, according to one embodiment. As described above, a TS network refers to a network adhering to the IEEE 802.1 standard for real-time data transfer whereas an NTS network refers to a real-time Ethernet network implementation such as PROFINET, which uses standards such as TCP/IP and Ethernet along with a mechanism for real time and isochronous real time communication, EtherCAT, which is an open high performance Ethernet-based fieldbus system, Ethernet/IP, which is designed for use in process control and other industrial automation applications, or Ethernet Powerlink, which is a deterministic real-time protocol for standard Ethernet, among others. The method shown in FIG. 9 may be used in conjunction with any of the systems or devices shown in any of the Figures described herein, among other devices. In various embodiments, some of the method elements shown may be performed concurrently, in a different order than shown, or may be omitted. Additional method elements may also be performed as desired. As shown, this method may operate as follows.

First, in 902 a TS network switch may be configured. The TS network switch may be similar to the TS network switches described above and may include a plurality of ports and a first functional unit coupled to the plurality of ports. Elements 912-962 may be performed in order to configure the TS network switch.

In 912, a first port of the plurality of ports may be configured to couple to an NTS node of the NTS network.

In 922, a second port of the plurality of ports may be configured to couple to a TS NIC similar to the TS NICs described above.

In 932, the first functional unit may be configured to insert a VLAN tag indicating the NTS network into each NTS packet received from the NTS network by the first port before routing each NTS packet to one or more other ports of the plurality of ports in the TS network switch, thereby generating tagged NTS packets.

In 942, the first functional unit may be configured to remove the VLAN tag from each received VLAN tagged NTS packet before forwarding, via the first port, each received VLAN tagged NTS packet to the NTS node.

In 952, the first functional unit may be configured to receive one or more of the tagged NTS packets from the first port and forward, via the second port, the one or more tagged NTS packets to the TS NIC.

In 962, the first functional unit may be configured to receive, by the second port, tagged NTS packets from the TS NIC and route tagged NTS packets to the first port.

In 904, the TS NIC may be configured. As mentioned, the TS NIC may be similar to the TS NICs described above and may include a second functional unit, a third port, a plurality of NTS receive packet queues, and a corresponding plurality of NTS transmit packet queues. Elements 914-924 may be performed in order to configure the TS network switch.

In 914, the second functional unit may be configured to queue tagged NTS packets received via the third port in the first NTS receive packet queue for subsequent provision to the device coupled to the TS NIC.

In 916, the second functional unit may be configured to queue NTS packets received from the device coupled to the TS NIC in the first NTS transmit packet queue and insert the VLAN tag indicating the NTS network into each NTS packet received from the first NTS transmit packet queue before forwarding, via the third port, each NTS packet to the second port, thereby generating tagged NTS packets.

In some embodiments, the method may further include the first functional unit inserting the VLAN tag indicating the NTS network into each NTS packet received by the first port from the NTS network before routing each NTS packet to one or more other ports of the plurality of ports in the TS network switch, thereby generating tagged NTS packets. In such embodiments, the first functional unit may also remove the VLAN tag from each received VLAN tagged NTS packet by the first port before forwarding each received VLAN tagged NTS packet to the NTS node. Further, the first functional unit may receive one or more of the tagged NTS packets from the first port and forward, via the second port, the one or more tagged NTS packets to the TS NIC. In addition, the first functional unit may receive, via the second port, tagged NTS packets from the TS NIC and then may route the tagged NTS packets to the first port.

Additionally, the second functional unit may queue tagged NTS packets received via the third port in the first NTS receive packet queue for subsequent provision to the device coupled to the TS NIC. Also, the second functional unit may queue NTS packets received from the device coupled to the TS NIC in the first NTS transmit packet queue and may insert the VLAN tag indicating the NTS network into each NTS packet received from the first NTS transmit packet queue before forwarding, via the third port, each NTS packet to the second port.

In certain embodiments, the method may further include configuring each of another one or more other ports of the plurality of ports of the TS network switch to couple to a corresponding other NTS network via a respective NTS node of the corresponding other NTS network. In such embodiments, the first functional unit may be further configured to insert a VLAN tag into each NTS packet received via each of the another one or more other ports from the NTS node of the corresponding other NTS network before routing each NTS packet to one or more ports of the plurality of ports in the TS network switch, where the VLAN tag indicates the respective NTS network, thereby generating tagged NTS packets. In addition, the first functional unit may be further configured to remove the VLAN tag from received VLAN tagged NTS packets before forwarding, via each of the another one or more other ports, each of the received VLAN tagged NTS packets to the respective NTS node of the corresponding other NTS network. Further, in some embodiments, the method may include coupling each of the another one or more other ports to the corresponding other NTS network via the respective NTS node of the corresponding other NTS network.

Additionally, the first functional unit may insert a VLAN tag into each NTS packet received via each of the another one or more other ports from the NTS node of the corresponding other NTS network before routing each NTS packet to one or more ports of the plurality of ports in the TS network switch, where the VLAN tag indicates the respective NTS network, thereby generating tagged NTS packets. Similarly, the first functional unit may remove the VLAN tag from received VLAN tagged NTS packets before forwarding, via each of the another one or more other ports, each of the received VLAN tagged NTS packets to the respective NTS node of the corresponding other NTS network.

Figure 10:
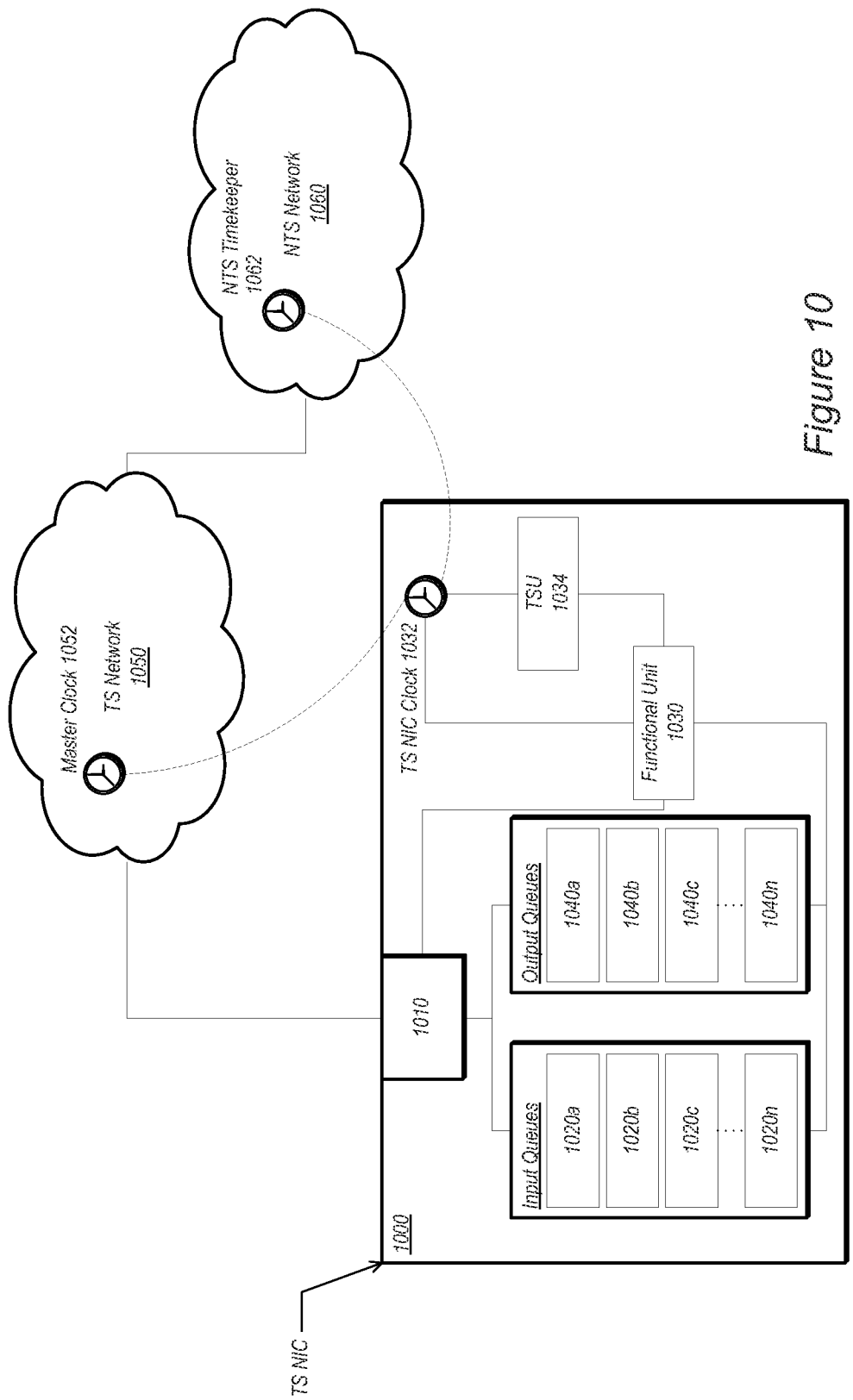
FIG. 10 is an exemplary block diagram of a TS NIC according to one embodiment.
Figure 11:
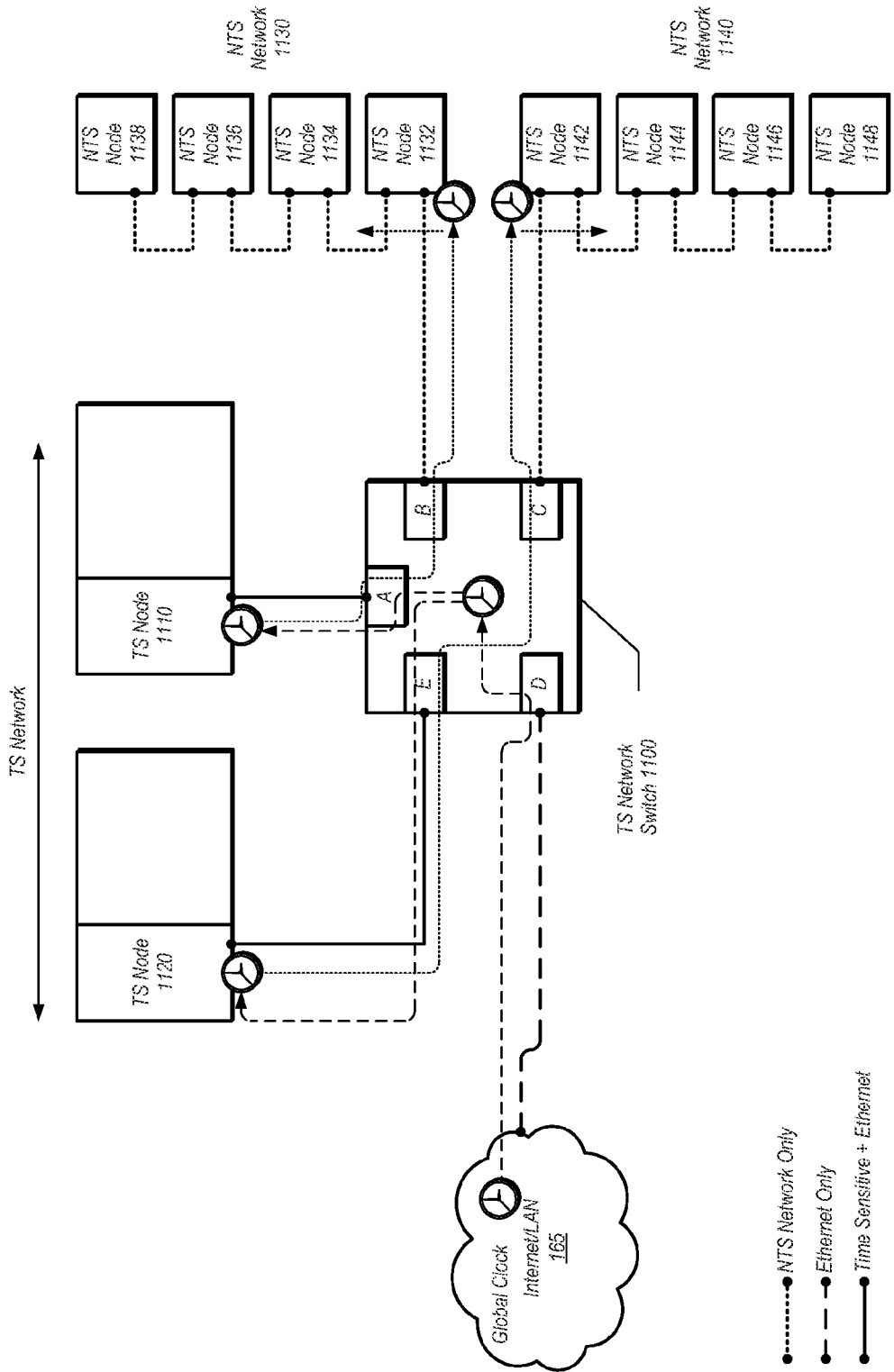
FIG. 11 illustrates an exemplary system for synchronizing clocks between a TS and NTS network according to one embodiment.
Figure 12:
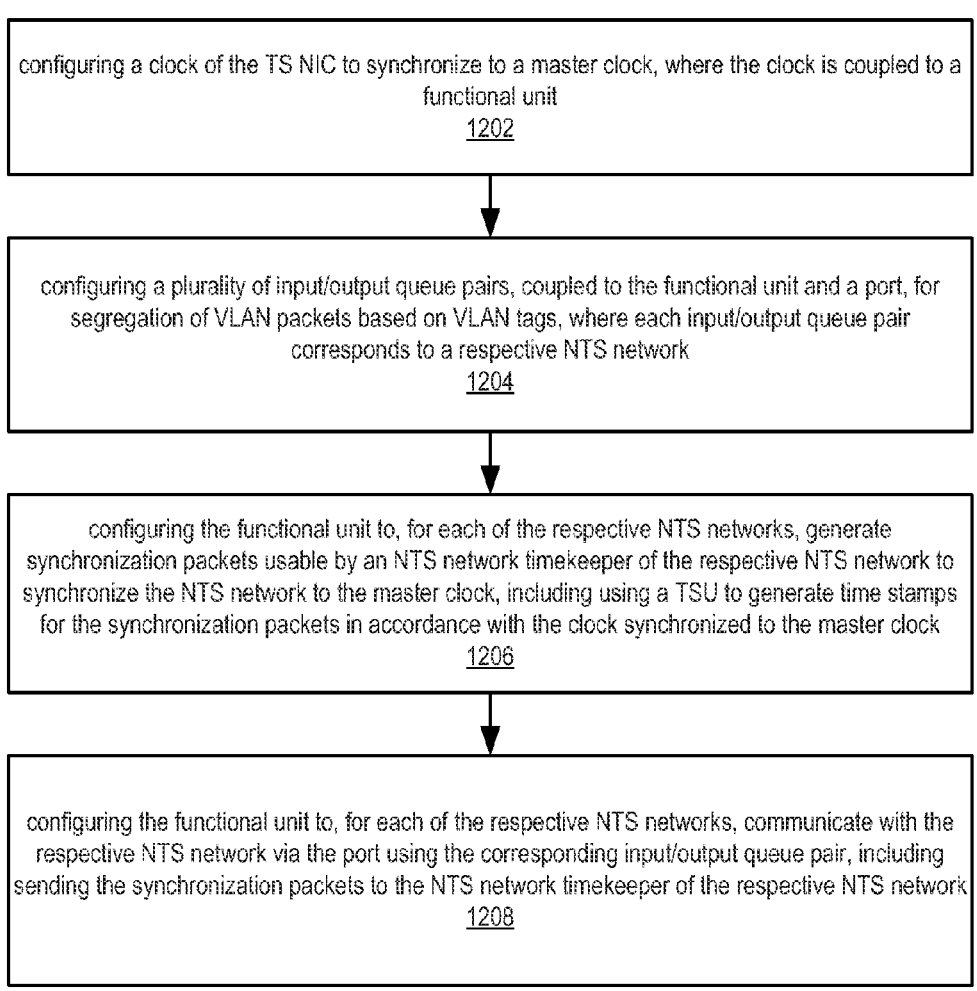
FIG. 12 is a flowchart diagram illustrating a method for synchronizing clocks between a TS and NTS network according to one embodiment.

FIGS. 10-12: Systems and Methods for Synchronizing a Master Clock Between Networks The systems and methods described below may allow for the synchronization between non-time sensitive (NTS) networks, e.g., real-time data transfer networks not conforming to the IEEE 802.1 standard for real-time data transfer and time-sensitive networks, e.g., networks conforming to the IEEE 802.1 standard for real-time data transfer, and non-time sensitive (NTS) networks. Most NTS networks implement a proprietary clock synchronization scheme, thus, in order to be fully interoperative with a TS network, the TS network clock synchronization may be required to be mapped to each NTS network coupled to the TS network. The systems and methods below allow for clock synchronization between TS and NTS networks.

FIG. 10: Exemplary Block Diagram of a TS NIC

FIG. 10 is a block diagram of an exemplary TS NIC for synchronizing clocks between a TS and an NTS network. TS NIC 1000 may be similar to the TS NICs described above. In some embodiments the TS NIC 1000 may include a functional unit, such as functional unit 1030, coupled to a port, such as port 1010. Additionally, the TS NIC may include a clock, such as clock 1032 coupled to the functional unit and synchronized to a master clock, such as Master Clock 1052 of TS network 1050. In some embodiments, the master clock may be included in a TS network switch of the TS network. In other embodiments, the master clock may be external to the TS network, such as a NTS network timekeeper. In certain embodiments, the master clock may be synchronized to a global clock external to the TS network.

The clock may also be coupled to a time stamp unit (TSU), such as TSU 1034. The TSU may also be coupled to the functional unit. In some embodiments, the TSU may be included in the physical layer of the TS NIC. Further, the TS NIC may include a plurality of input/output queue pairs, such as queues 1020a-1020n and 1040a-1040n coupled to the functional unit and the port, for segregation of virtual local area network (VLAN) packets based on VLAN tags, wherein each input/output queue pair corresponds to a respective non-time-sensitive (NTS) network. For example, input queue 1020a may have a corresponding output queue 1040a, and both may correspond to NTS network 1060. Additionally, the input queues may be NTS receive packet queues as discussed above and the output queues may be NTS transmit packet queues as discussed above.

For each of the respective NTS networks, the functional unit may be configured to generate synchronization packets usable by an NTS network timekeeper, e.g., a clock that is synchronized to a master clock, of the respective NTS network to synchronize the NTS network to the master clock, including using the TSU to generate time stamps for the synchronization packets in accordance with the clock synchronized to the master clock and communicate with the respective NTS network via the port using the corresponding input/output queue pair, including sending the synchronization packets to the NTS network timekeeper of the respective NTS network. In an exemplary embodiment, the first functional may be further configured to egress the synchronization packets via the output queue of the at least one input/output queue pair based on a specified egress period, wherein the specified egress period specifies a time window and frequency for egressing the synchronization packets.

Thus, for example, functional unit 1030 may generate synchronization packets usable by NTS timekeeper 1062 of NTS network 1060 to synchronize NTS network 1060 to master clock 1052 of TS network 1050. To generate the synchronization packets, functional unit 1030 may use TSU 1034 to generate time stamps for the synchronization packets in accordance clock 1032, synchronized to master clock 1052 of TS network 1050. Then, functional unit 1030 may communicate with NTS network 1060 via port 1010 using input queue 1020a and output queue 1040a, including sending the synchronization packets to NTS timekeeper 1062 of NTS network 1060.

It should be noted, that TS network 1050 may be required to include embodiments of the functionality discussed above to allow for the interoperability between TS network 1050 and 1060. Thus, the synchronization packets sent by TS NIC 1000 may be VLAN tagged NTS packets as described in detail above.

In some embodiments, the TS NIC may be included in a TS network node. In one embodiment, the TS network node may include the TS NIC and a TS network switch.

FIG. 11: Exemplary System for Synchronizing Clocks Between a TS and NTS Networks FIG. 11 is an illustration of an exemplary system for synchronizing clocks between a TS network and multiple NTS networks. As shown, the system may include TS network switch 1100 and TS nodes 1110 and 1120. TS network switch 1100 may be similar in functionality to the TS network switches previously described. Thus, TS network switch may include a functional unit configured to manage VLAN tags and data flow between a TS network and one or more NTS networks. In this particular example, TS network switch 1100 includes ports A-E. Port B may be configured to couple to NTS network 1130 which includes NTS nodes 1132-1138. Thus, the functional unit may be configured to insert a VLAN tag indicating NTS network 1130 in packets received from NTS node 1132 via port B. Similarly, port C may be configured to couple to NTS network 1140 which includes NTS nodes 1142-1148. Thus, the functional unit may also be configured to insert a VLAN tag indicating NTS network 1140 in packets received from NTS node 1142 via port C.

TS nodes 1110 and 1120 may each include a TS NIC configured similarly to TS NIC 1000 of FIG. 10. Therefore, TS nodes 1110 and 1120 may each include a clock synchronized to a master clock. In this particular example, the clock included in TS network switch 1100 may be configured as the master clock, e.g., the TS network master clock. Thus, the clocks of TS nodes 1110 and 1120 may each be synchronized to the clock of TS network switch 1100. Note that since TS nodes 1110 and 1120 each includes a clock synchronized to a master clock, both are considered timekeepers of the TS network. Additionally, the master clock of TS network switch 1100 may be synchronized to a global clock, such as the global clock of Internet/LAN 165.

Further, TS node 1120 may be configured to propagate its clock via synchronization packets to NTS node 1132, the timekeeper of NTS network 1130. Additionally, TS node 1110 may be configured to propagate its clock via synchronization packets to NTS node 1142, the timekeeper of NTS network 1142. Note that each NTS network incorporates its own mechanism of synchronizing clocks within each NTS network, thus, by synchronizing the NTS timekeeper for an NTS network, the entire NTS network may be synchronized with the TS network node. Thus, each NTS node of NTS network 1130 may be synchronized with TS node 1120 and each NTS node of NTS network 1140 may; be synchronized with TS node 1110. Therefore, all networks may be synchronized end-to-end.

FIG. 12: Flowchart for a Method for Synchronizing Clocks between a TS and an NTS Network FIG. 12 illustrates one embodiment of a method for a time-sensitive (TS) network interface controller (NIC) to synchronize a non-time-sensitive (NTS) network timekeeper. As described above, a TS network refers to networks adhering to the IEEE 802.1 standard for real-time data transfer whereas an NTS network refers to a real-time Ethernet network implementation such as PROFINET, which uses standards such as TCP/IP and Ethernet along with a mechanism for real time and isochronous real time communication, EtherCAT, which is an open high performance Ethernet-based fieldbus system, Ethernet/IP, which is designed for use in process control and other industrial automation applications, or Ethernet Powerlink, which is a deterministic real-time protocol for standard Ethernet, among others. The method shown in FIG. 12 may be used in conjunction with any of the systems or devices shown in any of the Figures described herein, among other devices. In various embodiments, some of the method elements shown may be performed concurrently, in a different order than shown, or may be omitted. Additional method elements may also be performed as desired. As shown, this method may operate as follows.

In 1202 a clock of the TS NIC may be configured to synchronize to a master clock, where the clock is coupled to a functional unit. The TS NIC may be similar to TS NIC 1000.

In 1204, a plurality of input/output queue pairs, coupled to the functional unit and a port, may be configured for segregation of VLAN packets based on VLAN tags, where each input/output queue pair corresponds to a respective NTS network. In some embodiments, the input/output queue pairs may include pairs of NTS receive packet queues and NTS transmit packet queues.

In 1206, the functional unit may be configured to, for each respective NTS network, generate synchronization packets usable by an NTS network timekeeper of the respective NTS network to synchronize the NTS network to the master clock. This may include using a TSU to generate time stamps for the synchronization packets in accordance with the clock synchronized to the master clock.

In 1208, the functional unit may be configured to, for each respective NTS network, communicate with the respective NTS network via the port using the corresponding input/output queue pair, including sending the synchronization packets to the NTS network timekeeper of the respective NTS network.

In certain embodiments, the method may further include the functional unit generating synchronization packets usable by an NTS network timekeeper of the respective NTS network to synchronize the NTS network to the master clock, including using the TSU to generate time stamps for the synchronization packets in accordance with the clock synchronized to the master clock. Additionally, the functional unit may communicate with the respective NTS network via the port using the corresponding input/output queue pair, including sending the synchronization packets to the NTS network timekeeper of the respective NTS network.

In an exemplary embodiment, the functional unit may be further configured to egress the synchronization packets via the output queue of the at least one input/output queue pair based on a specified egress period, wherein the specified egress period specifies a time window and frequency for egressing the synchronization packets. Further, the method may include the function unit egressing the synchronization packets via the output queue of the at least one input/output queue pair based on a specified egress period, wherein the specified egress period specifies a time window and frequency for egressing the synchronization packets.

Figure 13:
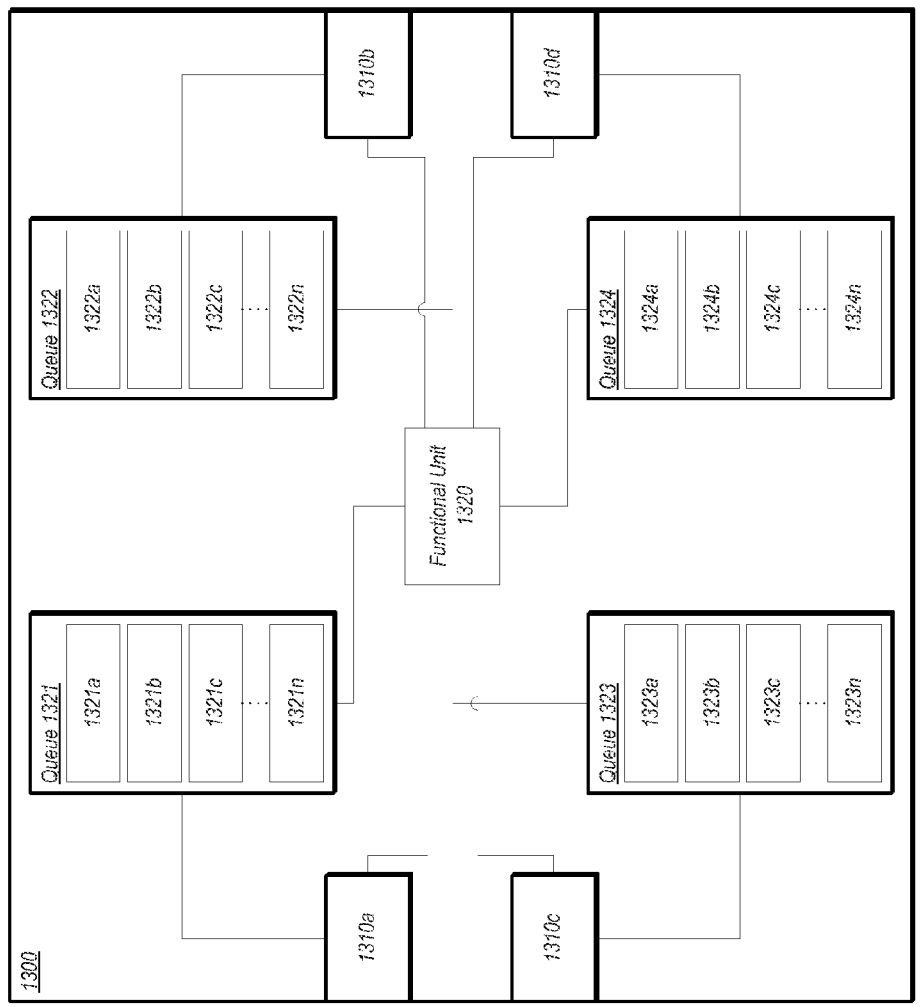
FIG. 13 is an exemplary block diagram of a TS network switch according to one embodiment.
Figure 14:
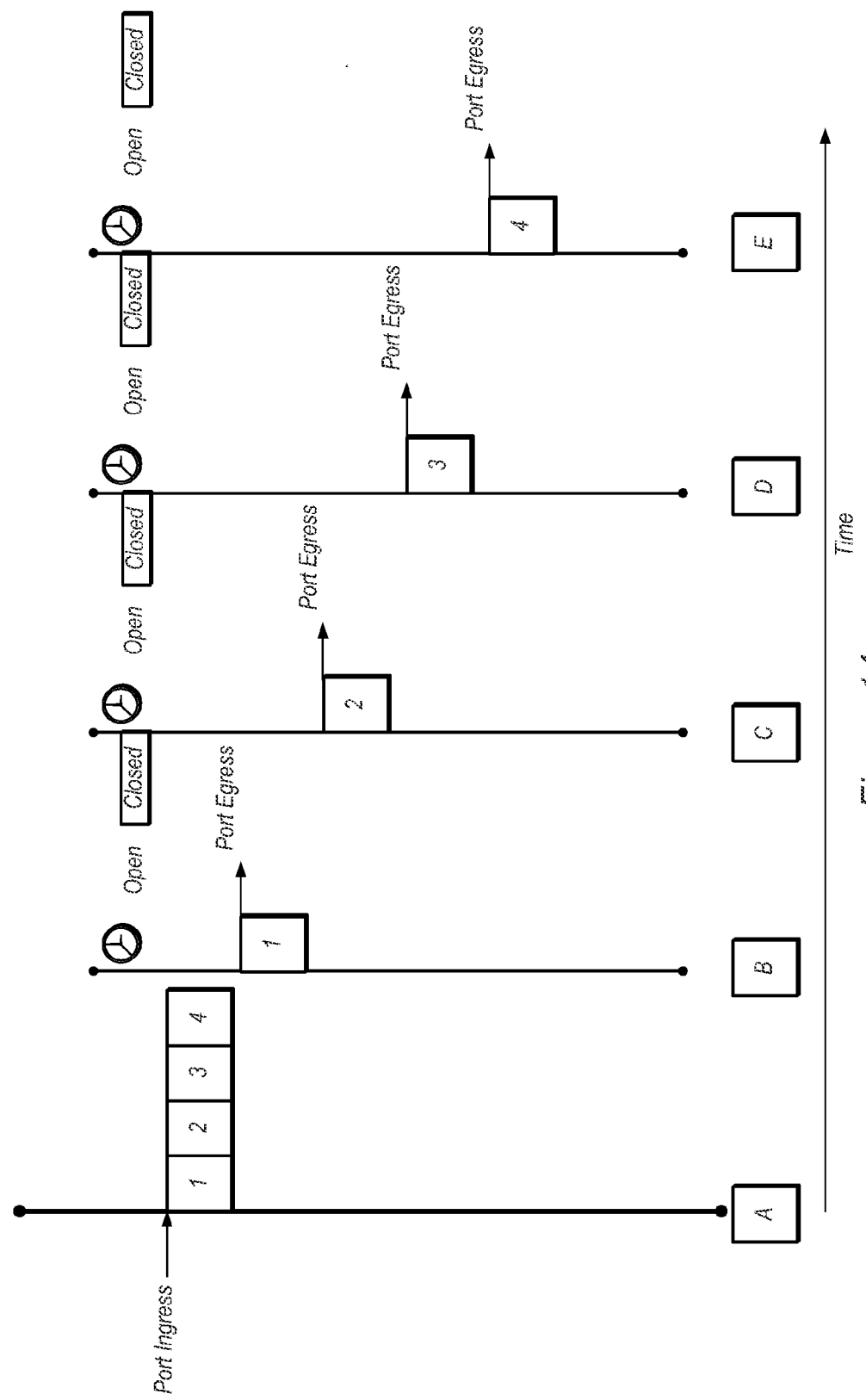
FIG. 14 is an illustration of a time-based scheduled egress from a TS network switch according to one embodiment.

FIGS. 13-15: Systems and Methods for Scheduled Data Egress from a TS Network Switch The systems and methods described below may allow for the scheduled egress of data from a TS network switch, and allow the scheduling overhead of a TS network node to be offloaded to a TS network switch. Thus, the TS network node may send a plurality of packets to the TS network switch that need to be scheduled and the TS network switch may schedule and send the packets at the scheduled time.

FIG. 13: Exemplary Block Diagram of a TS Network Switch Configured for Scheduled Data Egress FIG. 13 is an exemplary block diagram of a TS network switch configured for scheduled data egress according to one embodiment. As shown in FIG. 13, a TS network switch, such as TS network switch 1300, may include a functional unit, such as functional unit 1320. Additionally, the TS network switch may include a plurality of ports, such as ports 1310a-1310d, and each port may be coupled to the functional unit and associated with a respective set of network addresses for TS packets. Each port may be further configured with a respective set of egress periods, where each TS packet has a destination address and a type that specifies a respective egress period, where each egress period may specify a respective time window and frequency for egressing TS packets to network nodes based on the type of the TS packets. Further, the TS network switch may include a plurality of queues, coupled to the plurality of ports and the functional unit, such as queues 1321a-1321n coupled to port 1310a, queues 1322a-1322n coupled to port 1310b, queues 1323a-1323n coupled to port 1310c, and queues 1324a-1324n coupled to port 1310d. Also, each queue may be associated with a respective TS packet type and a respective port of the plurality of ports.

In certain embodiments, the functional unit may be configured to receive one or more TS packets asynchronously from a network node via a first port. Thus, for example, functional unit 1320 may receive one or more TS packets asynchronously from a network node via port 1310a. In some embodiments, the first port may be configured to couple to an NTS node of an NTS network. In other embodiments, the first port may be configured to couple to a TS network node of a TS network. Additionally, the functional unit may be configured to determine a second port, such as port 1310b for egressing at least one of the one or more TS packets based on the destination address of the at least one TS packet. In some embodiments, the second port may be configured to couple to an NTS node of an NTS network. In other embodiments, the second port may be configured to couple to a TS network node of a TS network. Further, the functional unit may be configured to determine an egress period for egressing the at least one TS packet based on the type of the at least one TS packet. Also, the functional unit may be configured to determine that the at least one TS packet cannot currently be egressed from the second port. In some embodiments, to determine that a respective time window for egress of the at least one TS packet is closed, the functional unit may be further configured to determine that there is already a queued TS packet of the same type queued in the first queue for egress from the second port or determine that the second port is currently egressing a TS packet.

In response to determining that the at least one TS packet cannot currently be egressed, the functional unit may queue the at least one TS packet in a first queue of the plurality of queues based on the respective TS packet type and destination address, where the first queue is associated with the second port. For example, functional unit 1320 may determine that port 1310b cannot currently egress the at least one TS packet and, in response, may queue the at least one TS packet in queue 1322b.

The functional unit may be additionally configured to egress the at least one TS packet in the respective time window from the second port. Thus, for example, functional unit 1320 may egress the at least one TS packet via port 1310b in the respective time window for port 1310b. In some embodiments, the at least one TS packet may include two or more TS packets. In such embodiments, the respective time window of the determine egress period may be specified to allow the egress of one of the two or more TS packets. In certain embodiments where the at least one TS packet may include two or more TS packets, specifying the respective time window of the determined egress may include determining a quantity of the two or more TS packets to egress each egress period and configuring the respective time window to allow the egress of the quantity each egress period. In some embodiments, where two or more ports of the TS network switch may be configured to couple to respective NTS networks, TS packets for each of the two or ports may be scheduled to egress concurrently, thus allowing two or more NTS networks to receive TS packets concurrently.

FIG. 14: Illustration of a Time-Based Scheduled Egress from a TS Network Switch FIG. 14 is an illustration of an exemplary schedule for a time-based data egress from a TS network switch, such as TS network switch 1300. At time A, TS packets 1-4 may be asynchronously ingressed to the TS network switch and queued as described above. For simplification, it is assumed that all TS packets egressed at time A are of the same packet type and same destination address. Additionally, for simplicity, it is assumed that the egress period is specified such that a single TS packet egresses each egress period. Then, at time B, TS packet 1 is dequeued and egressed. During the egress of TS packet 1, the "window of time" is "open" allowing the TS packet to be egressed. Then, after a specified duration, the "window of time" is "closed" and the TS switch waits for the next egress period to begin. At time C, TS packet 2 is dequeued and egressed. Similarly, at times D and E, TS packets 3 and 4, respectively, are dequeued and egressed. In such a manner, TS packets received asynchronously at the TS network switch may be egressed on a time-based schedule.

FIG. 15: Flowchart of a Method for Scheduled Data Egress from a TS Network Switch FIG. 15 illustrates a method for scheduled data egress from a TS network switch, according to one embodiment. The method shown in FIG. 15 may be used in conjunction with any of the systems or devices shown in any of the Figures described herein, among other devices. In various embodiments, some of the method elements shown may be performed concurrently, in a different order than shown, or may be omitted. Additional method elements may also be performed as desired. As shown, this method may operate as follows.

In 1502, a TS network switch may be provided. The TS network switch may include a functional unit, a plurality of ports, and a plurality of queues. The plurality of ports may be coupled to the functional unit and may be associated with a respective set of network addresses for TS packets. Additionally, each port may be configured with a respective set of egress periods and each TS packet may have a destination address and a type that may specify a respective egress period. Further, each egress period may specify a respective time window and frequency for egressing TS packets to network nodes based on the type of the TS packets. Also, the plurality of queues may be coupled to the plurality of ports and the functional unit and may be associated with a respective TS packet type and a respective port of the plurality of ports.

In 1504, the functional unit may be configured to receive one or more TS packets asynchronously from a network node via a first port. In some embodiments, the first port may be configured to couple to an NTS node of an NTS network. In other embodiments, the first port may be configured to couple to a TS network node of a TS network.

In 1506, the functional unit may be configured to determine a second port of the plurality of ports for egressing at least one of the one or more the TS packets based on the destination address of the at least one TS packet. In some embodiments, the second port may be configured to couple to an NTS node an NTS network. In other embodiments, the second port may be configured to couple to a TS network node of a TS network.

In 1508, the functional unit may be configured to determine an egress period for egressing the at least one TS packet based on the type of the at least one TS packet. In some embodiments, the at least one TS packet may include two or more TS packets. In such embodiments, the respective time window of the determined egress period may be specified to allow the egress of one of the two or more TS packets. Alternatively, in other such embodiments, to specifying the respective time window of the determined egress may include determining a quantity of the two or more TS packets to egress each egress period and configuring the respective time window to allow the egress of the quantity each egress period.

In 1510, the functional unit may be configured to determine that the at least one TS packet cannot currently be egressed from the second port. In some embodiments, to determine that the at least one TS packet cannot currently be egressed, the functional unit may be further configured to determine that a respective time window for egress of the at least one TS packet is closed, determine that there is already a queued TS packet of the same type queued in the first queue for egress from the second port, or determine that the second port is currently egressing a TS packet.

In 1512, the functional unit may be configured to queue the at least one TS packet in a first queue of the plurality of queues based on the respective TS packet type and destination address in response to determining that the at least one TS packet cannot currently be egressed, wherein the first queue is associated with the second port.

In 1514, the functional unit may be configured to egress the at least one TS packet in the respective time window from the second port.

In further embodiments of the method, the functional unit may receive one or more TS packets asynchronously from a network node via a first port and determine a second port of the plurality of ports for egressing at least one of the one or more the TS packets based on the destination address of the at least one TS packet. Additionally, the functional unit may determine an egress period for egressing the at least one TS packet based on the type of the at least one TS packet and determine that the at least one TS packet cannot currently be egressed from the second port. Also, the functional unit may queue the at least one TS packet in a first queue of the plurality of queues based on the respective TS packet type and destination address in response to determining that the at least one TS packet cannot currently be egressed, where the first queue is associated with the second port. Accordingly, the at least one TS packet may be egressed in the respective time window from the second port.

In certain embodiments of the method, the functional unit, in order to determine that the at least one TS packet cannot currently be egressed, may determine that a respective time window for egress of the at least one TS packet is closed, determine that there is already a queued TS packet of the same type queued in the first queue for egress from the second port, or determine that the second port is currently egressing a TS packet.

In other embodiments of the method, the TS packet may include two or more TS packets. In such embodiments, the respective time window of the determined egress period may be specified to allow the egress of one of the two or more TS packets. Alternatively, specifying the respective time window of the determined egress may include the functional unit determining a quantity of the two or more TS packets to egress each egress period and configuring the respective time window to allow the egress of the quantity each egress period.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A system for interoperating between a time-sensitive (TS) network and a non-time-sensitive (NTS) network, the system comprising:
    a TS network switch, comprising a first functional unit coupled to a plurality of ports, wherein a first port of the plurality of ports is configured to couple to an NTS node of the NTS network; and
    a TS network interface controller (NIC), wherein the TS NIC is configured to couple to a second port of the plurality of ports of the TS network switch, wherein the TS NIC comprises:
        a second functional unit;
        a third port, coupled to the second functional unit;
        a plurality of NTS receive packet queues, coupled to the second functional unit and the third port, configured to store received packets from respective NTS networks, wherein a first NTS receive packet queue corresponds to the NTS network; and
        a corresponding plurality of NTS transmit packet queues, coupled to the second functional unit and the third port, configured to store packets received from a device coupled to the TS NIC for the respective NTS networks, wherein a first NTS transmit packet queue corresponds to the NTS network;
    wherein the first functional unit is configured to:
        insert a virtual local area network (VLAN) tag indicating the NTS network into each NTS packet received from the NTS network by the first port before routing each NTS packet to one or more other ports of the plurality of ports in the TS network switch, thereby generating tagged NTS packets;
        remove the VLAN tag from each received VLAN tagged NTS packet before forwarding, via the first port, each received VLAN tagged NTS packet to the NTS node;
        receive, via the second port, one or more of the tagged NTS packets from the first port and forward, via the second port, the one or more tagged NTS packets to the TS NIC; and
        receive, via the second port, tagged NTS packets from the TS NIC and route tagged NTS packets to the first port;
    wherein the second functional unit is configured to:
        queue tagged NTS packets received via the third port in the first NTS receive packet queue for subsequent provision to the device coupled to the TS NIC; and
        queue NTS packets received from the device coupled to the TS NIC in the first NTS transmit packet queue and insert the VLAN tag indicating the NTS network into each NTS packet received from the first NTS transmit packet queue before forwarding, via the third port, each NTS packet to the second port, thereby generating tagged NTS packets.

2. The system of claim 1, wherein a TS network node comprises:
    the TS NIC.

3. The system of claim 1, wherein a TS network node comprises:
    the TS network switch; and
    the TS NIC.

4. The system of claim 3, wherein the TS network node is configured as a bridge between the TS network and the NTS network.

5. The system of claim 3, wherein the system further comprises:
    one or more additional TS network nodes, each comprising a respective TS network switch and TS NIC, wherein the TS network node and the one or more additional TS network nodes comprise a plurality of TS network nodes; and
    wherein each TS network node of the plurality of TS network nodes is configured as a bridge between the TS network and a respective NTS network, thereby allowing interoperability between the TS network and a plurality of NTS networks.

6. The system of claim 1, wherein another one or more other ports of the plurality of ports of the TS network switch are each configured to:
    couple to a corresponding other NTS network via a respective NTS node of the corresponding other NTS network, wherein the first functional unit is further configured to:
        insert a VLAN tag into each NTS packet received by each of the another one or more other ports from the NTS node of the corresponding other NTS network before routing each NTS packet to one or more ports of the plurality of ports in the TS network switch, wherein the VLAN tag indicates the respective NTS network, thereby generating tagged NTS packets; and remove the VLAN tag from received VLAN tagged NTS packets before forwarding, via each of the another one or more other ports, each of the received VLAN tagged NTS packets to the respective NTS node of the corresponding other NTS network.

7. A method for interoperating between a time-sensitive (TS) network and a non-time-sensitive (NTS) network, the method comprising:
configuring a TS network switch, comprising a plurality of ports and a first functional unit coupled to the plurality of ports, wherein said configuring comprises:
configuring a first port of the plurality of ports to couple to an NTS node of the NTS network; and
configuring a second port of the plurality of ports to couple to a TS network interface controller (NIC); and
configuring the first functional unit to:
insert a virtual local area network (VLAN) tag indicating the NTS network into each NTS packet received from the NTS network by the first port before routing each NTS packet to one or more other ports of the plurality of ports in the TS network switch, thereby generating tagged NTS packets; and
remove the VLAN tag from each received VLAN tagged NTS packet before forwarding, via the first port, each received VLAN tagged NTS packet to the NTS node;
receive one or more of the tagged NTS packets from the first port and forward, via the second port, the one or more tagged NTS packets to the TS NIC; and
receive, by the second port, tagged NTS packets from the TS NIC and route tagged NTS packets to the first port; and
configuring the TS NIC, wherein the TS NIC comprises:
a second functional unit;
a third port, coupled to the second functional unit;
a plurality of NTS receive packet queues, coupled to the second functional unit and the third port, configured to store received packets from respective NTS networks, wherein a first NTS receive packet queue corresponds to the NTS network; and
a corresponding plurality of NTS transmit packet queues, coupled to the second functional unit and the third port, configured to store packets received from a device coupled to the TS NIC for the respective NTS networks, wherein a first NTS transmit packet queue corresponds to the NTS network; and
wherein said configuring the TS NIC comprises:
configuring the second functional unit to:
queue tagged NTS packets received via the third port in the first NTS receive packet queue for subsequent provision to the device coupled to the TS NIC; and
queue NTS packets received from the device coupled to the TS NIC in the first NTS transmit packet queue and insert the VLAN tag indicating the NTS network into each NTS packet received from the first NTS transmit packet queue before forwarding, via the third port, each NTS packet to the second port, thereby generating tagged NTS packets.

8. The method of claim 7, further comprising:
the first functional unit performing:
inserting the VLAN tag indicating the NTS network into each NTS packet received by the first port from the NTS network before routing each NTS packet to one or more other ports of the plurality of ports in the TS network switch, thereby generating tagged NTS packets; and
removing the VLAN tag from each received VLAN tagged NTS packet by the first port before forwarding each received VLAN tagged NTS packet to the NTS node;
receiving one or more of the tagged NTS packets from the first port and forwarding, via the second port, the one or more tagged NTS packets to the TS NIC; and
receiving, by the second port, tagged NTS packets from the TS NIC and routing tagged NTS packets to the first port; and
the second functional unit performing:
queuing tagged NTS packets received via the third port in the first NTS receive packet queue for subsequent provision to the device coupled to the TS NIC; and
queuing NTS packets received from the device coupled to the TS NIC in the first NTS transmit packet queue and insert the VLAN tag indicating the NTS network into each NTS packet received from the first NTS transmit packet queue before forwarding, via the third port, each NTS packet to the second port, thereby generating tagged NTS packets.

9. The method of claim 7, wherein a TS network node comprises the TS NIC.

10. The method of claim 7, wherein a TS network node comprises:
the TS network switch; and
the TS NIC.

11. The method of claim 10, further comprising:
configuring the TS network node as a bridge between the TS network and the NTS network.

12. The method of claim 11, wherein the TS network node and one or more additional TS network nodes, each comprising a respective TS network switch and TS NIC, comprise a plurality of TS network nodes, wherein the method further comprises:
configuring each TS network node of the plurality of TS network nodes as a bridge between the TS network and a respective NTS network, thereby allowing interoperability between the TS network and a plurality of NTS networks.

13. The method of claim 7, further comprising:
configuring each of another one or more other ports of the plurality of ports of the TS network switch to couple to a corresponding other NTS network via a respective NTS node of the corresponding other NTS network, wherein the first functional unit is further configured to:
insert a VLAN tag into each NTS packet received via each of the another one or more other ports from the NTS node of the corresponding other NTS network before routing each NTS packet to one or more ports of the plurality of ports in the TS network switch, wherein the VLAN tag indicates the respective NTS network, thereby generating tagged NTS packets; and
remove the VLAN tag from received VLAN tagged NTS packets before forwarding, via each of the another one or more other ports, each of the received VLAN tagged NTS packets to the respective NTS node of the corresponding other NTS network.

14. The method of claim 13, further comprising:
coupling each of the another one or more other ports to the corresponding other NTS network via the respective NTS node of the corresponding other NTS network; and the first functional unit performing:

inserting a VLAN tag into each NTS packet received via each one of the another one or more other ports from the NTS node of the corresponding other NTS network before routing each NTS packet to one or more ports of the plurality of ports in the TS network switch, wherein the VLAN tag indicates the respective NTS network, thereby generating tagged NTS packets; and removing the VLAN tag from received VLAN tagged NTS packets before forwarding, via each of the another one or more other ports, each of the received VLAN tagged NTS packets to the respective NTS node of the corresponding other NTS network.

15. A time-sensitive (TS) network node for interoperating between a TS network and a non-time-sensitive (NTS) network, the TS network node comprising:

a functional unit;

a plurality of ports coupled to the functional unit, wherein a first port of the plurality of ports is configured to couple to an NTS node of the NTS network;

a plurality of NTS receive packet queues, coupled to the functional unit, and configured to store received packets from respective NTS networks, wherein a first NTS receive packet queue corresponds to the NTS network; and a corresponding plurality of NTS transmit packet queues, coupled to the functional unit, and configured to store packets received from a device coupled to the TS NIC for the respective NTS networks, wherein a first NTS transmit packet queue corresponds to the NTS network;

wherein the functional unit is configured to:

communicate tagged NTS packets with the TS network via a second port;

insert a virtual local area network (VLAN) tag indicating the NTS network into each NTS packet received from the NTS network by the first port before routing each NTS packet to the second port, one or more other ports of the plurality of ports, or to the first NTS receive packet queue, thereby generating tagged NTS packets;

remove the VLAN tag from each VLAN tagged NTS packet received by the second port, the one or more other ports of the plurality of ports, or from the first NTS transmit packet queue before forwarding, via the first port, each received VLAN tagged NTS packet to the NTS node of the NTS network;

queue at least a subset of tagged NTS packets received by the TS network node in the first NTS receive packet queue for subsequent provision to the device coupled to the TS network node; and queue NTS packets received from the device coupled to the TS network node in the first NTS transmit packet queue and insert the VLAN tag indicating the NTS network into each NTS packet queued in the first NTS transmit packet queue before forwarding each NTS packet to the first port, thereby generating tagged NTS packets.

* * * * *